US012784471B2

(12) United States Patent
Kim

(10) Patent No.: US 12,784,471 B2
(45) Date of Patent: Nov. 3, 2026

(54) SYSTEM FOR RECOGNIZING GESTURES OF VEHICLE PASSENGER

(71) Applicants: Hyundai Motor Company, Seoul (KR); Kia Corporation, Seoul (KR)

(72) Inventor: Young Rok Kim, Suwon (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 256 days.

(21) Appl. No.: 18/608,234

(22) Filed: Mar. 18, 2024

(65) Prior Publication Data

US 2025/0118092 A1 Apr. 10, 2025

(30) Foreign Application Priority Data

Oct. 10, 2023 (KR) ........................ 10-2023-0134482

(51) Int. Cl.
*G06V 20/59* (2022.01)
*G06V 10/70* (2022.01)
*G06V 40/20* (2022.01)

(52) U.S. Cl.
CPC .............. *G06V 20/59* (2022.01); *G06V 10/70* (2022.01); *G06V 40/28* (2022.01); *G06V 2201/07* (2022.01)

(58) Field of Classification Search
CPC ........ G06V 20/59; G06V 10/70; G06V 40/28; G06V 2201/07
USPC .......................................................... 382/103
See application file for complete search history.

(56) References Cited

FOREIGN PATENT DOCUMENTS

KR 10-2029842 B1 10/2019

OTHER PUBLICATIONS

Aftab, Abdul Rafey, Michael von der Beeck, and Michael Feld. "You have a point there: Object selection inside an automobile using gaze, head pose and finger pointing." Proceedings of the 2020 International Conference on Multimodal Interaction. 2020. (Year: 2020).*

Kim, Kyung-Min, and Jung-In Choi. "Passengers' gesture recognition model in self-driving vehicles: Gesture recognition model of the passengers' obstruction of the vision of the driver." 2019 IEEE 4th international conference on computer and communication systems (ICCCS). IEEE, 2019. (Year: 2019).*

Mateu-Mateus, Marc, et al. "A non-contact camera-based method for respiratory rhythm extraction." Biomedical Signal Processing and Control 66 (2021): 102443. (Year: 2021).*

(Continued)

*Primary Examiner* — Jonathan S Lee
(74) *Attorney, Agent, or Firm* — Fox Rothschild LLP

(57) ABSTRACT

A passenger gesture recognition system for gesture recognition of a passenger of a vehicle is carried out using a gesture of the passenger limited to an area around a seat belt. The system includes a controller having target area detection unit that detects a detection target area based on an image captured by an image sensor in an area around webbing of the seat belt fastened to a passenger, a hidden area detection unit that detects an area hidden within the detection target area by the gesture of the passenger, and a signal output unit that outputs an output signal designated for the hidden area and controls a function with respect to the output signal to be performed.

20 Claims, 29 Drawing Sheets

(56) References Cited

OTHER PUBLICATIONS

Yi, Qiao, and Qu Yi. "Safety belt wearing detection algorithm based on human joint points." 2021 IEEE International Conference on Consumer Electronics and Computer Engineering (ICCECE). IEEE, 2021. (Year: 2021).*

Khorsandi, Pouya M., et al. "FabriCar: Enriching the user experience of in-car media interactions with ubiquitous vehicle interiors using e-textile sensors." Proceedings of the 2023 ACM Designing Interactive Systems Conference. 2023. (Year: 2023).*

* cited by examiner

SYSTEM FOR RECOGNIZING GESTURES OF VEHICLE PASSENGER

CROSS-REFERENCE TO RELATED APPLICATION

This application claims under 35 U.S.C. § 119 (a) the benefit of Korean Patent Application No. 10-2023-0134482, filed on Oct. 10, 2023, the entire contents of which are incorporated by reference herein.

BACKGROUND

(a) Technical Field

The present disclosure relates to a passenger gesture recognition system for a vehicle, more particularly, to the passenger gesture recognition system for performing and recognizing gestures in an area around a seat belt of the vehicle.

(b) Description of the Related Art

Recently, various systems have been proposed to recognize passenger gestures in vehicles.

However, existing systems have problems including complicated algorithms and high development costs such as labeling labor costs for many databases.

In addition, in addition to the disadvantage of increased material costs due to the use of high-performance hardware (an image sensor, a 3D camera, a TOF camera, a high-performance processor, etc.), there is also a disadvantage of camera recognition errors caused by light reflection and light blurring due to external conditions.

In particular, there is an inconvenience in that an area in which a passenger performs a gesture is designated and thus a user must move in the designated area.

For example, in the case of a relaxed posture such as leaning back a seatback of a vehicle seat, it is difficult to recognize the posture since the distance from the designated area increases.

In addition, if a gesture motion is large and inaccurate, it is difficult to properly recognize the motion, which increases inconvenience compared to directly pressing a button.

Furthermore, since gestures and functions are not intuitive, it is difficult to use the functions, and the types of gestures and functions that can be connected are limited.

In addition, a method of increasing a gesture recognition rate by wearing a wrist-worn wearable device has been proposed, but it is inconvenient for the user to wear the wearable device, such an additional device incurs costs, and there is also the risk of losing the device.

The matters described as background technology above are only for the purpose of improving understanding of the background of the present disclosure and should not be taken as acknowledgment that they correspond to prior art already known to those skilled in the art.

SUMMARY

The present disclosure provides a passenger gesture recognition system for a vehicle that is capable of simplifying an algorithm for gesture recognition and improving a gesture recognition rate by performing and recognizing gestures limited to an area around a seat belt.

In accordance with an aspect of the present disclosure, the above and other objects can be accomplished by the provision of a system for recognizing gestures of a passenger, including a target area detection unit configured to detect a detection target area based on an image captured by an image sensor, the detection target area located around webbing of a seat belt fastened to the passenger, a hidden area detection unit configured to detect an area hidden within the detection target area by a gesture of the passenger, and a signal output unit configured to output an output signal designated for the hidden area and control a function with respect to the output signal to be performed.

The target area detection unit may detect patterns within the detection target area.

The patterns may be printed on a belt cover provided on the webbing or the webbing.

The target area detection unit may detect the belt cover provided on the webbing based on a captured image of the passenger, set a cover area including the belt cover as a detection target area, and detect patterns provided on the belt cover within the set cover area.

The target area detection unit may detect an upper body of the passenger based on a captured image of the passenger, set an upper body area as a detection target area, and detect patterns provided on the webbing within the set upper body area.

The hidden area may be an area where a pattern hidden by a gesture is located among the patterns.

The signal output unit may output an output signal designated for the hidden pattern.

The target area detection unit may detect the belt cover provided on the webbing based on a captured image of the passenger, set a cover area including the belt cover as a detection target area, segment the set cover area, and detect the segmented areas.

The system may further include a hand detection unit configured to detect a passenger's hand positioned within the detection target area by a gesture, and the hidden area may be a segmented area hidden by the passenger's hand.

The signal output unit may output an output signal designated for the hidden segmented area.

In accordance with another aspect of the present disclosure, there is provided a system for recognizing gestures of a passenger, including a target area detection unit configured to detect a detection target area based on an image captured by an image sensor, the detection target area located around webbing of a seat belt fastened to a passenger, a hand detection unit configured to detect a passenger's hand positioned within the detection target area by a gesture when the passenger performs the gesture, and a signal output unit configured to output an output signal designated for the position of the hand and control a function with respect to the output signal to be performed.

The target area detection unit may detect an upper body of the passenger and set an upper body area as a detection target area, and the hand detection unit may detect a position of a hand on a path of the webbing located within the upper body area.

The signal output unit may secure a classification value of the hand position by comparing coordinates of the detected hand position with designated coordinates of the upper body area, and output an output signal designated for the secured classification value.

A vehicle may include the system for recognizing gestures of the passenger.

In accordance with a further aspect of the present disclosure, there is provided a system for recognizing gestures of a passenger, including a gesture tracking unit configured to track a gesture movement within a detection target area based on an image captured by an image sensor when the passenger performs a gesture moving along webbing of a seat belt fastened to the passenger, and a signal output unit configured to output an output signal designated for the gesture movement and control a function with respect to the output signal to be performed.

The system may further include a target area detection unit configured to detect a detection target area around the webbing, and an object detection unit configured to detect a gesture object located within the detection target area by a gesture, and the gesture tracking unit may track a gesture object moving within the detection target area by a gesture of the passenger.

The target area detection unit may detect the webbing of the seat belt based on a captured image of the passenger and sets the webbing as a detection target area, and the object detection unit may detect one of a passenger's hand moving along the webbing, a belt cover, and a belt clip as a gesture object.

The surface of the gesture object may be coated with reflective paint.

The signal output unit may determine whether there is a designated output signal bundle for a detected hand shape.

The system may further include a gesture sensor provided to be movable along the webbing by a gesture of the passenger, and the gesture tracking unit may track the gesture sensor moving along the webbing when the passenger performs a gesture.

The signal output unit may determine whether there is a designated output signal bundle for a movement pattern of the gesture sensor.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION

Figure 1:
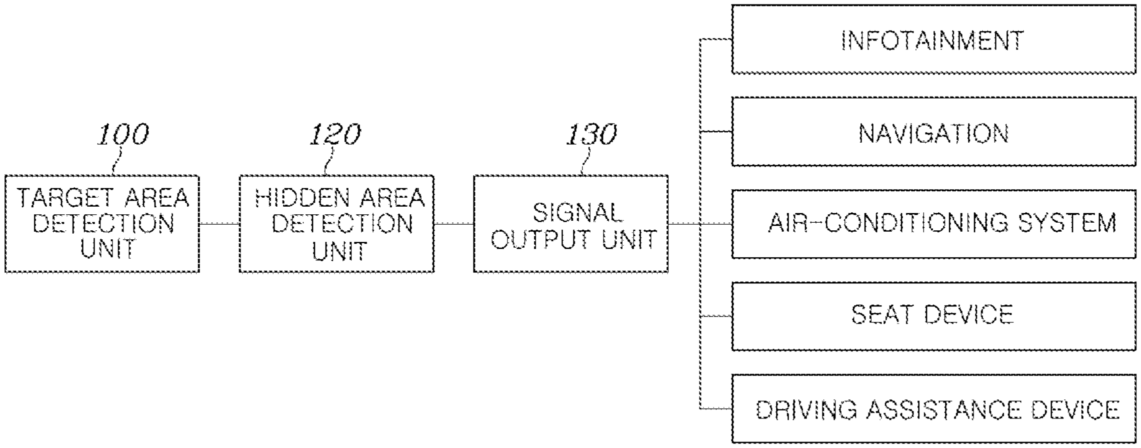
FIG. 1 is a diagram showing a configuration of first and second embodiments of a gesture recognition system according to the present disclosure.
Figure 2:
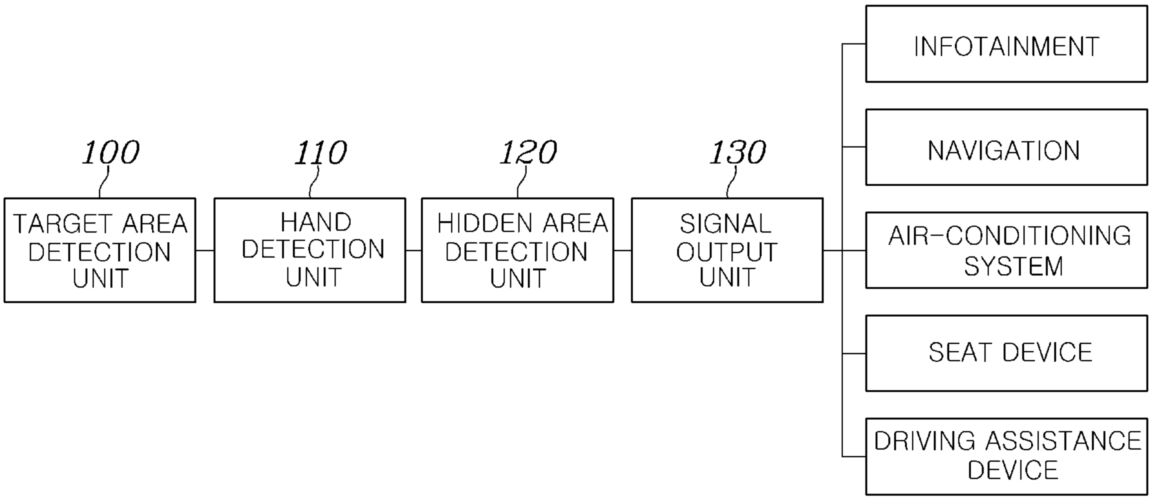
FIG. 2 is a diagram showing a configuration of a third embodiment of the gesture recognition system according to the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Reference will now be made in detail to the preferred embodiments of the present disclosure, examples of which are illustrated in the accompanying drawings. Wherever possible, the same reference numbers will be used throughout the drawings to refer to the same or like parts.

In the following description of the embodiments disclosed in the present specification, a detailed description of known functions and configurations incorporated herein will be omitted when it may obscure the subject matter of the present disclosure. In addition, the accompanying drawings are provided only for ease of understanding of the embodiments disclosed in the present specification, do not limit the technical spirit disclosed herein, and include all changes, equivalents and substitutes included in the spirit and scope of the present disclosure.

The terms "first" and/or "second" are used to describe various components, but such components are not limited by these terms. The terms are used to discriminate one component from another component.

When a component is "coupled" or "connected" to another component, it should be understood that a third component may be present between the two components although the component may be directly coupled or connected to the other component. When a component is "directly coupled" or "directly connected" to another component, it should be understood that no element is present between the two components.

An element described in the singular form is intended to include a plurality of elements unless the context clearly indicates otherwise.

Preferred embodiments of the present disclosure will be described in detail with reference to the accompanying drawings as follows.

A configuration of first to third embodiments of a passenger gesture recognition system according to the present disclosure includes a target area detection unit 100 that detects a detection target area around webbing 500 of a seat belt fastened to a passenger, a hidden area detection unit 120 that detects an area hidden within the detection target area by a gesture when the passenger performs the gesture, and a signal output unit 130 that outputs a designated output signal for the hidden area and controls a function with respect to the output signal to be performed.

The target area detection unit 100, the hidden area detection unit 120, and the signal output unit 130 as depicted in FIG. 1, for example, may be performed by a controller. The controller may be provided with one or more modules and/or devices including the above units. For example, the modules and/or devices may constitute hardware components that form part of the controller (e.g., modules or devices of a high-level controller), or may constitute individual controllers each having a processor and memory. A vehicle according to the disclosure may include one or more processors and memory.

For example, the target area detection unit 100 detects a detection target area based on an image captured by an image sensor 400, and the image sensor 400 may be a vision sensor that detects infrared (IR) and RGB (colors).

Figure 6:
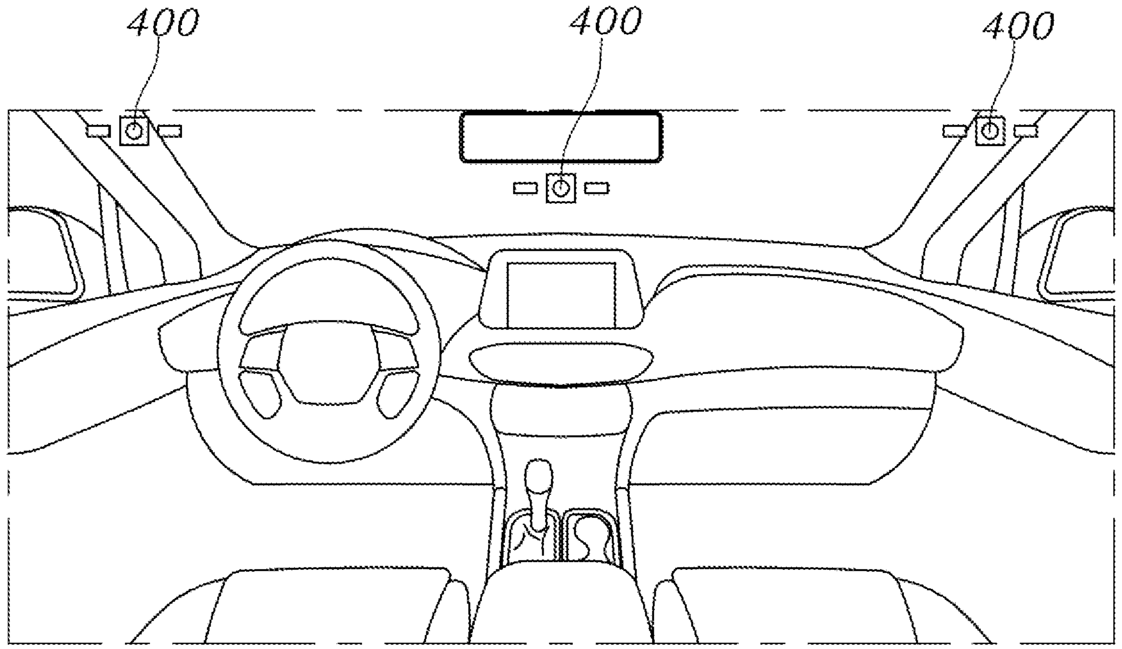
FIG. 6 is a diagram illustrating locations where an image-capturing means is installed according to the present disclosure.
Figure 7:
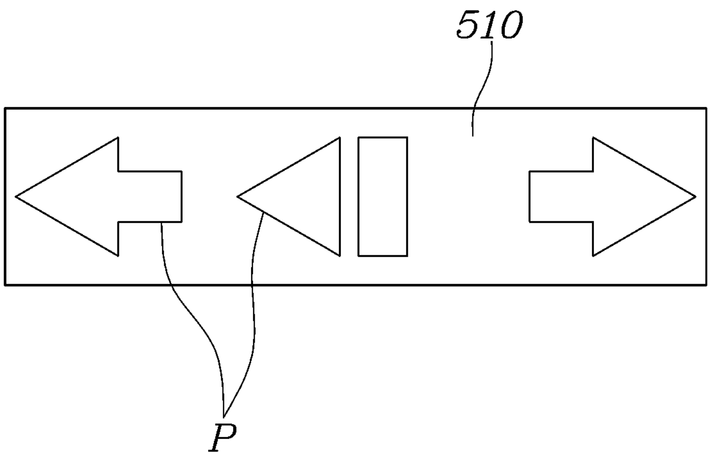
FIGS. 7 to 9 are diagrams illustrating patterns printed on a belt cover according to the present disclosure.
Figure 8:
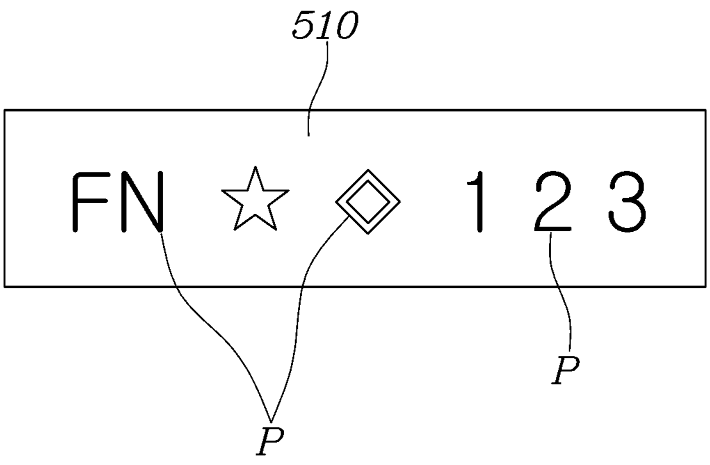
Figure 9:
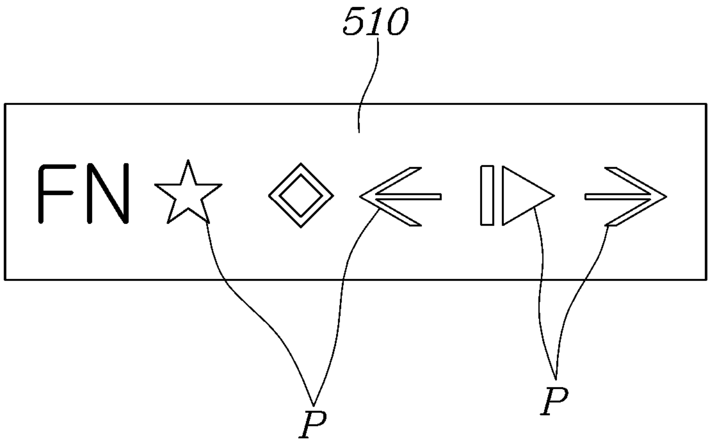

The image sensor 400 is installed inside a vehicle compartment as shown in FIG. 6 and detects a passenger seated on the seat and the webbing 500 of the seat belt.

At least one image sensor 400 may be installed. If one image sensor 400 is installed, it can be installed at the front center of the windshield or roof, and if two image sensors are installed, they can be installed on both sides of the front of the windshield or roof.

In addition, the target area detection unit 100 detects a detection target area by limiting the same to an area around the webbing 500 of the seat belt. The webbing 500 may be shoulder webbing worn on the passenger's shoulders and upper body.

Accordingly, hardware resources are saved by reducing the area in which the target area detection unit 100 operates to detect the detection target area, and misdetection of the detection target area and a malfunction are prevented by preventing operation in an area without the webbing 500.

A hidden area identified through the hidden area detection unit 120 is a part of the detection target area which is hidden by the passenger's hand according to a gesture of the passenger (user), and the hidden area can be confirmed based on an image captured by the image sensor 400.

The signal output unit 130 serves to output an output signal with respect to a portion hidden by the hidden area.

It is possible to operate electronic devices such as infotainment devices, a navigation system, an air conditioning system, seat devices, and driving assistance devices mounted on the vehicle using signals output from the signal output unit 130.

That is, by designating the detection target area limited to the webbing 500 of the seat belt always worn on the passenger, the algorithm is simplified and a labeling image capacity used for a DB is minimized, reducing development costs, and costs for hardware construction are minimized using the configuration of the algorithm that can sufficiently operate even with low-quality images.

Moreover, since a command is made with a simple gesture covering the webbing 500, it is possible to perform a gesture without having to be conscious of the designated area in which a gesture must be made, which not only improves the convenience of performing a gesture but also improves the gesture recognition rate.

In the present disclosure, the target area detection unit 100 can detect patterns P within the detection target area.

Figure 10:
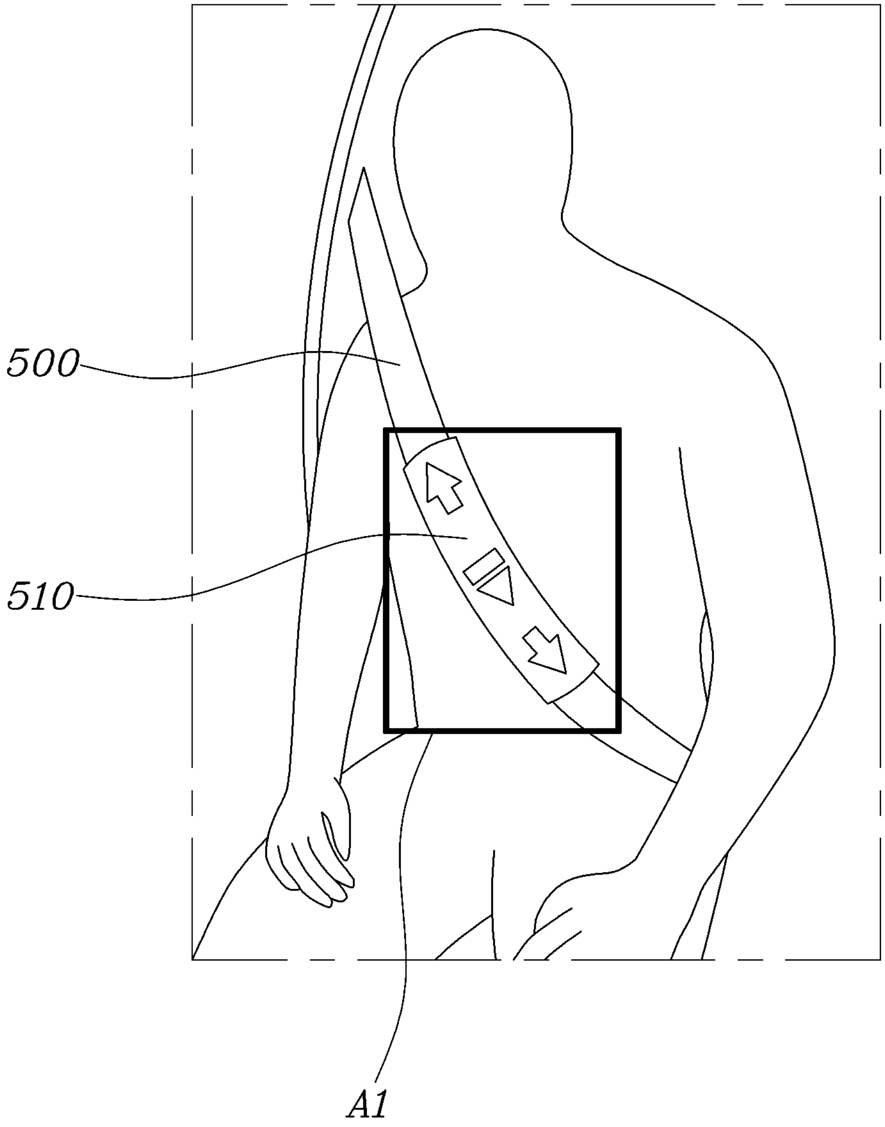
FIGS. 10 to 12 are diagrams for describing an operation of recognizing a gesture according to the first embodiment of the gesture recognition system of the present disclosure.
Figure 11:
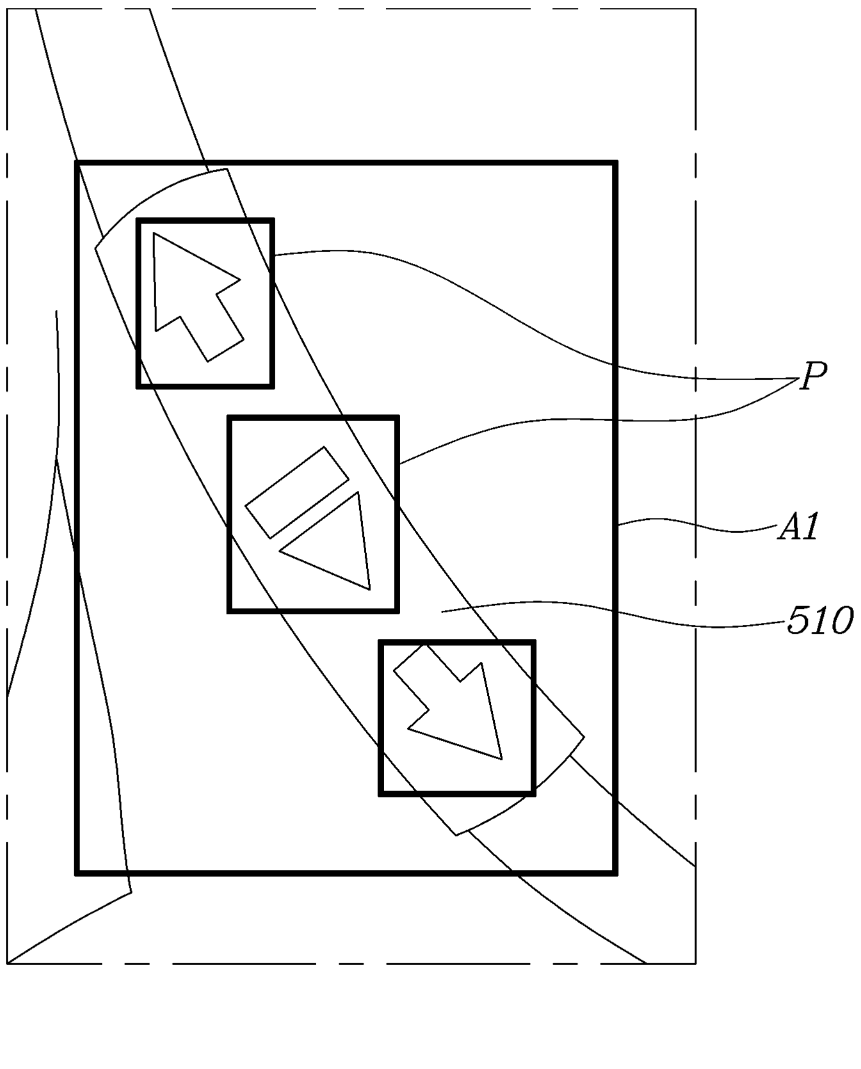
Figure 12:
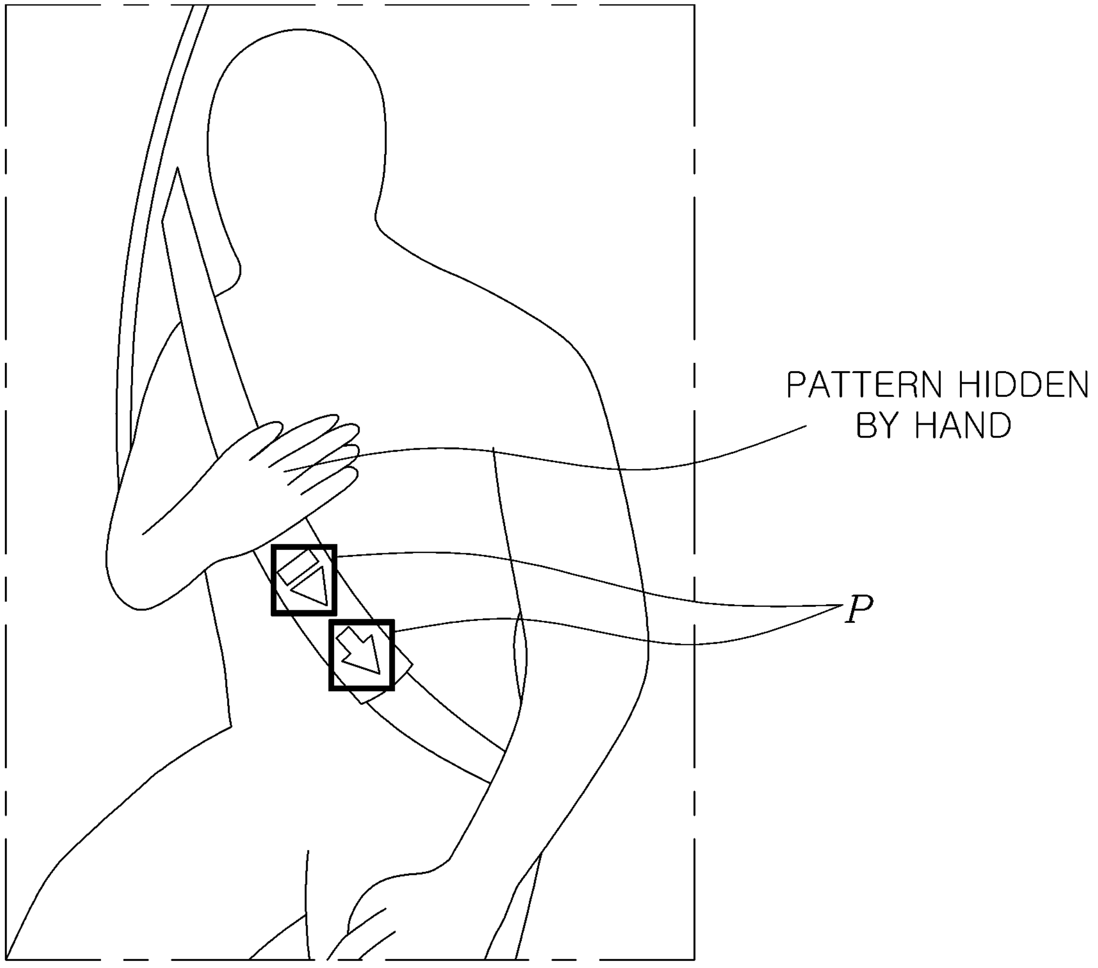

For example, as shown in FIGS. 10 to 12, the patterns P may be printed on a belt cover 510 provided on the webbing 500.

That is, the designated patterns P may be printed on the belt cover 510 of the seat belt or a ring-shaped belt clip. The belt cover 510 may be able to move along the webbing 500 without interfering with insertion/extraction of the webbing 500.

Figure 13:
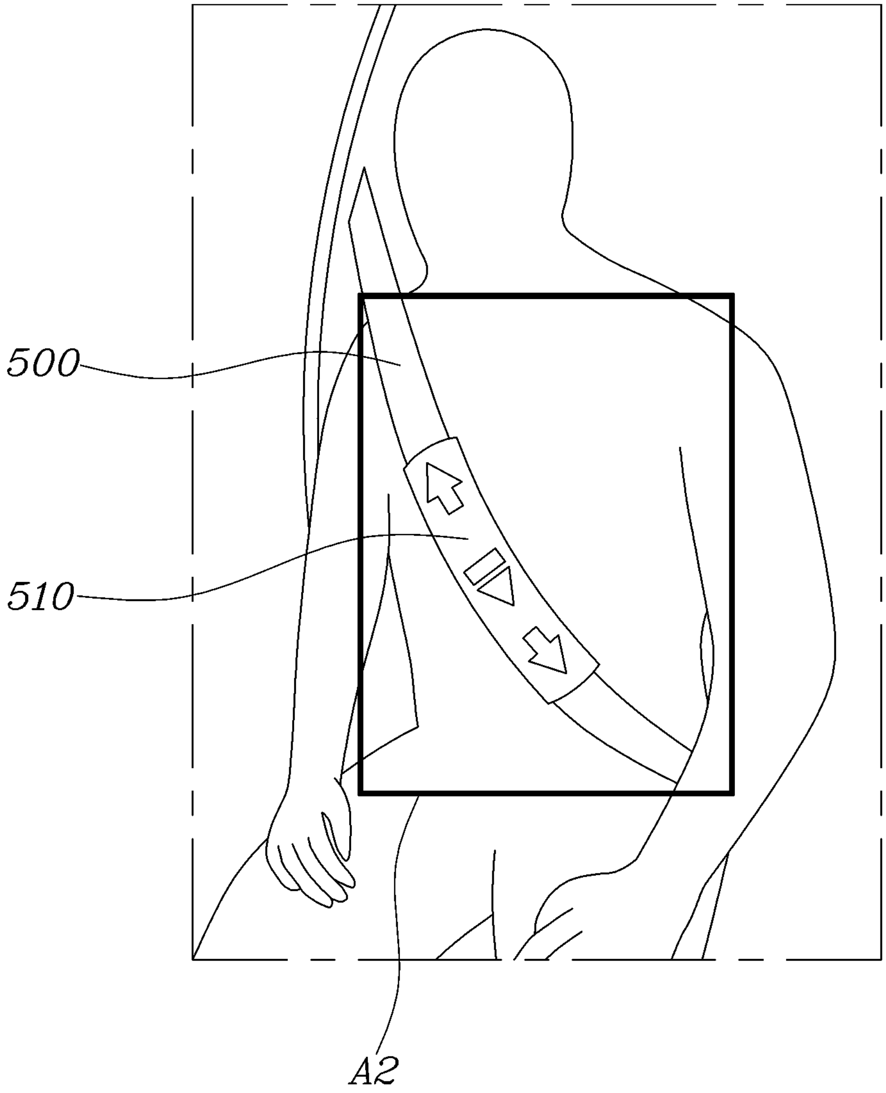
FIGS. 13 to 15 are diagrams for describing an operation of recognizing a gesture according to the second embodiment of the gesture recognition system of the present disclosure.
Figure 14:
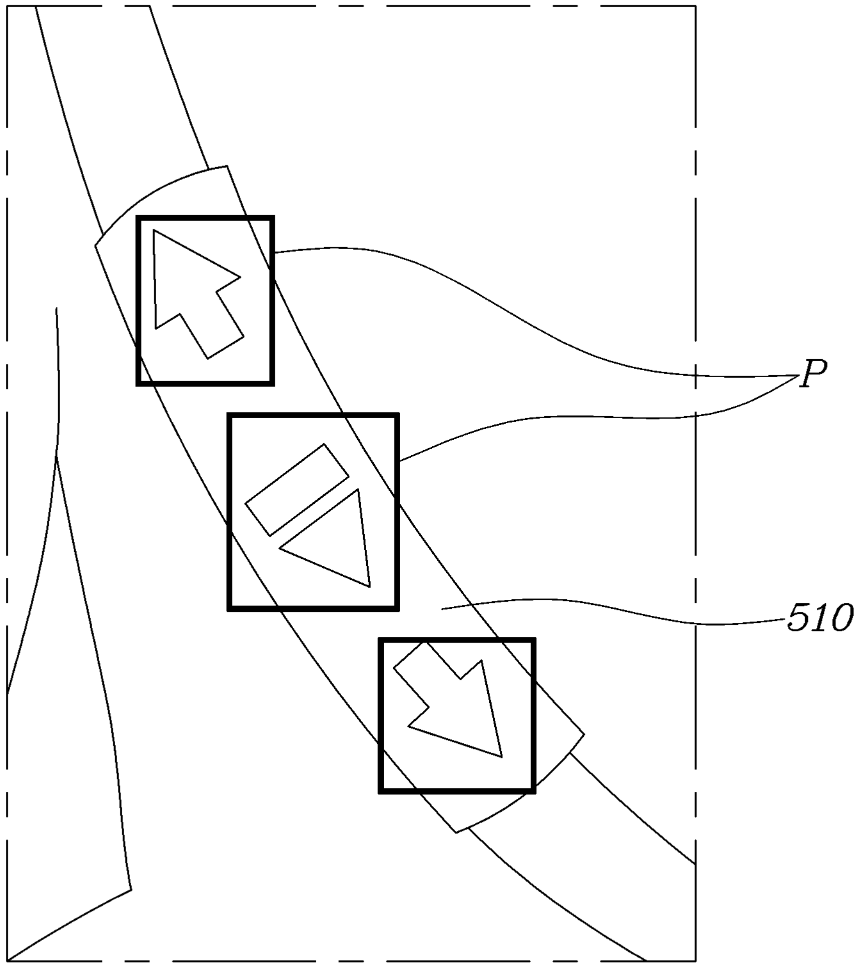
Figure 15:
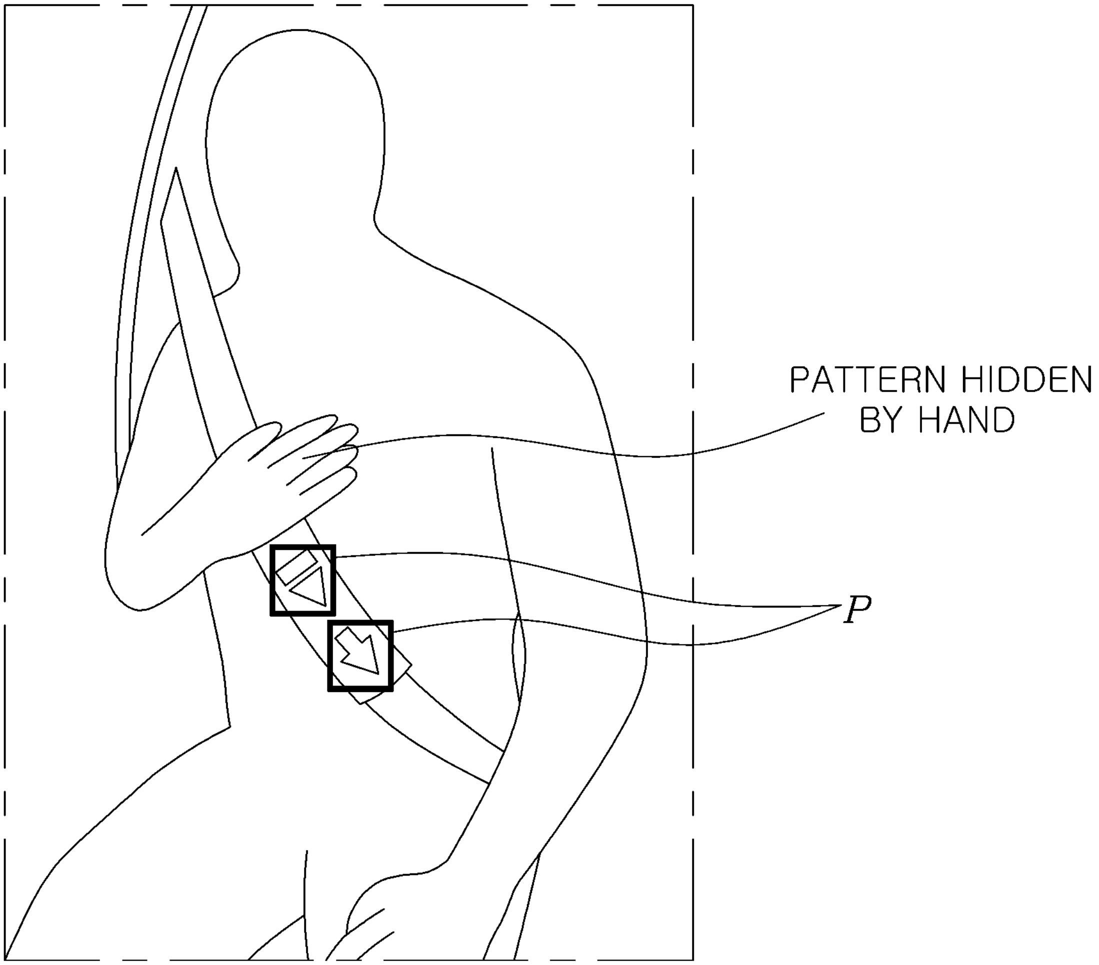

As another example, as shown in FIGS. 13 to 15, the patterns P may be printed directly on the webbing 500.

The configuration of the first embodiment of the gesture recognition system is described in detail with reference to FIG. 1 and FIGS. 10 to 12. The target area detection unit 100 may detect the belt cover 510 provided on the webbing 500 based on a captured image of the passenger, set a cover area A1 including the belt cover 510 as a detection target area, and detect the patterns P provided on the belt cover 510 within the set cover area A1.

In addition, the hidden area may be an area in which a pattern P that is hidden by a gesture operation is located among the patterns P.

Additionally, the signal output unit 130 may output an output signal designated for the hidden pattern P.

Specifically, the target area detection unit 100 may be an object detector that individually detects objects shown in an image through an image recognition algorithm based on AI.

Accordingly, as shown in FIG. 10, the target area detection unit 100 detects the cover area A1 including the belt cover 510 in the form of a square box from an image captured by the image sensor 400.

Then, as shown in FIG. 11, the patterns P printed on the belt cover 510 may be detected in the form of a square box within the detected cover area A1.

Subsequently, as shown in FIG. 12, when a pattern P is hidden by a passenger's hand among the patterns P printed on the belt cover 510, the hidden pattern P can be detected by the hidden area detection unit 120.

Here, an output signal may be designated for each pattern P.

Accordingly, the signal output unit 130 outputs the output signal designated for the hidden pattern P, and thus the function of the electronic device corresponding to the output signal can be performed.

For reference, if two patterns P are hidden together, a function different from the function when one pattern P is hidden is set to be performed, thereby increasing the number of executable functions.

The configuration of the second embodiment of the gesture recognition system is described in detail with reference to FIG. 1 and FIGS. 13 to 15. The target area detection unit 100 may detect the upper body of the passenger based on a captured image of the passenger, set the upper body area A2 as a detection target area, and detect the patterns P provided on the webbing 500 within the set upper body area A2.

In addition, the hidden area may be an area where a pattern P hidden by a gesture operation among the patterns P is located.

Additionally, the signal output unit 130 may output an output signal designated for the hidden pattern P.

Specifically, the target area detection unit 100 may be a passenger detector that detects the body shape of the passenger and a body part of the passenger through an image recognition algorithm based on AI.

Here, the passenger detector 310 may detect a body part of the passenger using skeleton-based body key point technology, but other algorithms capable of detecting a body part of the passenger may also be used.

Accordingly, as shown in FIG. 13, the upper body area A2 including the upper body of the passenger is detected in the form of a square box from an image captured by the image sensor 400.

In addition, as shown in FIG. 14, the patterns P printed on the belt cover 510 may be detected in the form of a square box within the detected upper body area A2.

Here, although not shown in the figures, the patterns P may be printed directly on the webbing 500 rather than on the belt cover 510. In this case, the patterns P printed on the webbing 500 may be detected in the form of a square box.

Subsequently, as shown in FIG. 15, when a pattern P is hidden by a passenger's hand among the patterns P printed on the belt cover 510, the hidden pattern P can be detected by the hidden area detection unit 120.

Here, an output signal may be designated for each pattern P.

Accordingly, the signal output unit 130 outputs the output signal designated for the hidden pattern P, and thus the function of the electronic device corresponding to the output signal can be performed.

The configuration of the third embodiment of the gesture recognition system is described in detail with reference to FIG. 2 and FIGS. 16 to 18. The target area detection unit 100 may detect the belt cover 510 provided on the webbing 500 based on a captured image of the passenger, set the cover area A1 including the belt cover 510 as a detection target area, segment the set cover area A1, and detect the segmented areas.

In addition, a hand detection unit 110 that detects a passenger's hand positioned within the detection target area according to a gesture operation is further provided, and the hidden area may be a segmented area a that is hidden by the passenger's hand among the segmented areas.

The signal output unit 130 may output an output signal designated for the hidden segmented area a.

Specifically, the target area detection unit 100 may be an object detector that individually detects objects shown in an image through an image recognition algorithm based on AI.

Additionally, the hand detection unit 110 may be a passenger detector that detects the body shape and a body part of the passenger through an image recognition algorithm based on AI.

Figure 16:
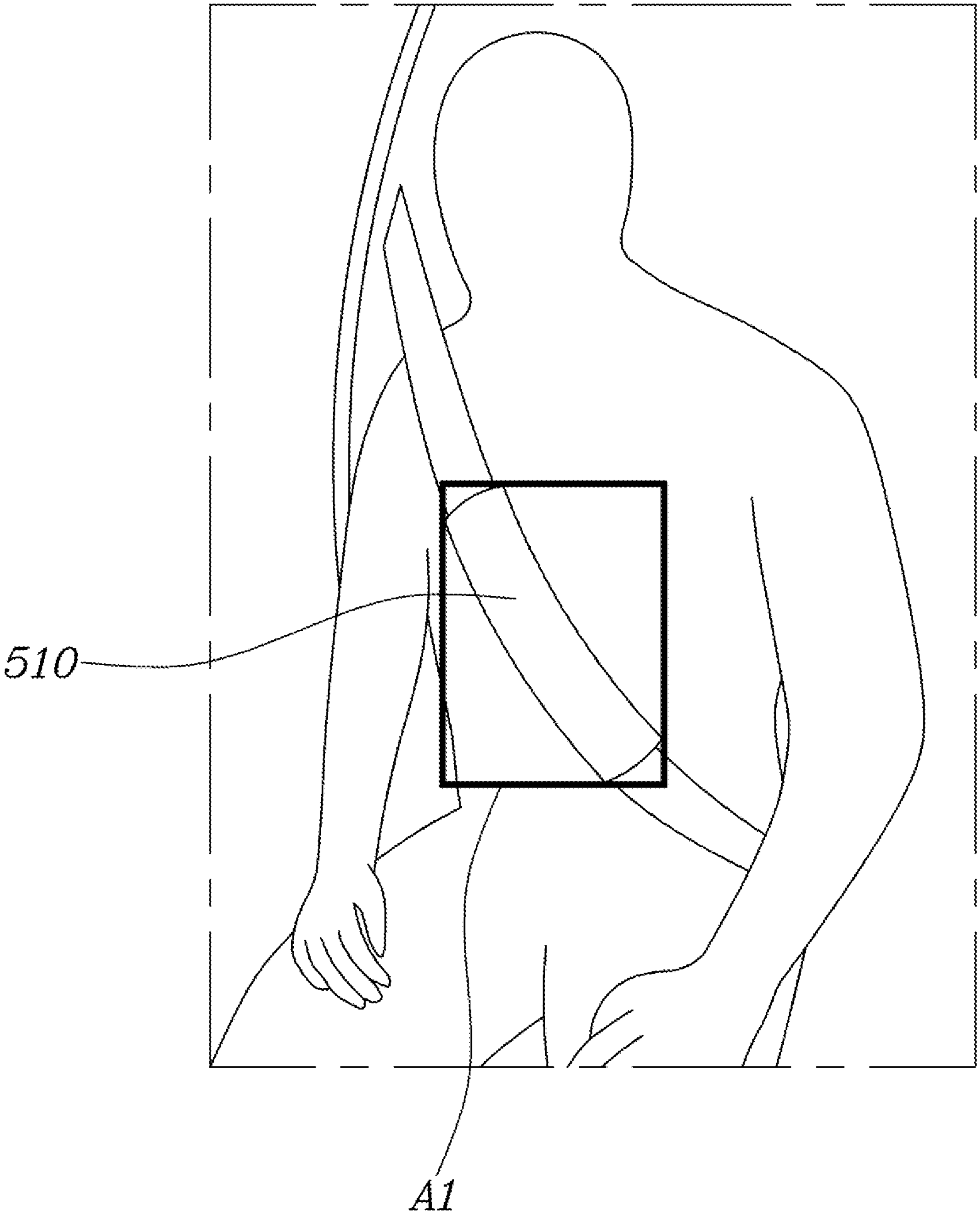
FIGS. 16 to 18 are diagrams for describing an operation of recognizing a gesture according to the third embodiment of the gesture recognition system of the present disclosure.

Accordingly, as shown in FIG. 16, the cover area A1 including the belt cover 510 is detected in the form of a square box from the image captured by the image sensor 400.

Figure 17:
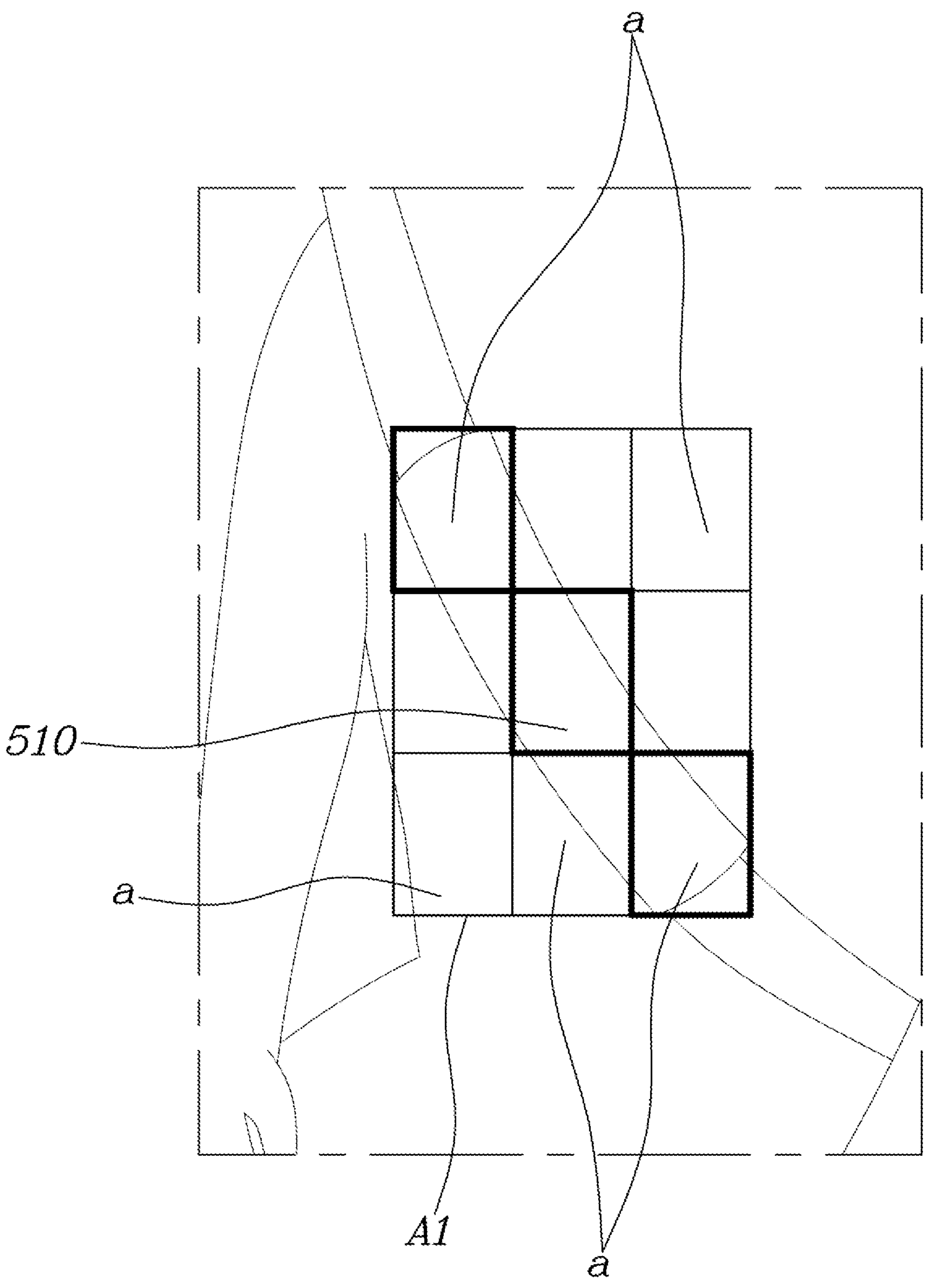

Then, as shown in FIG. 17, the detected cover area A1 is segmented by a set number to detect the segmented area a.

Figure 18:
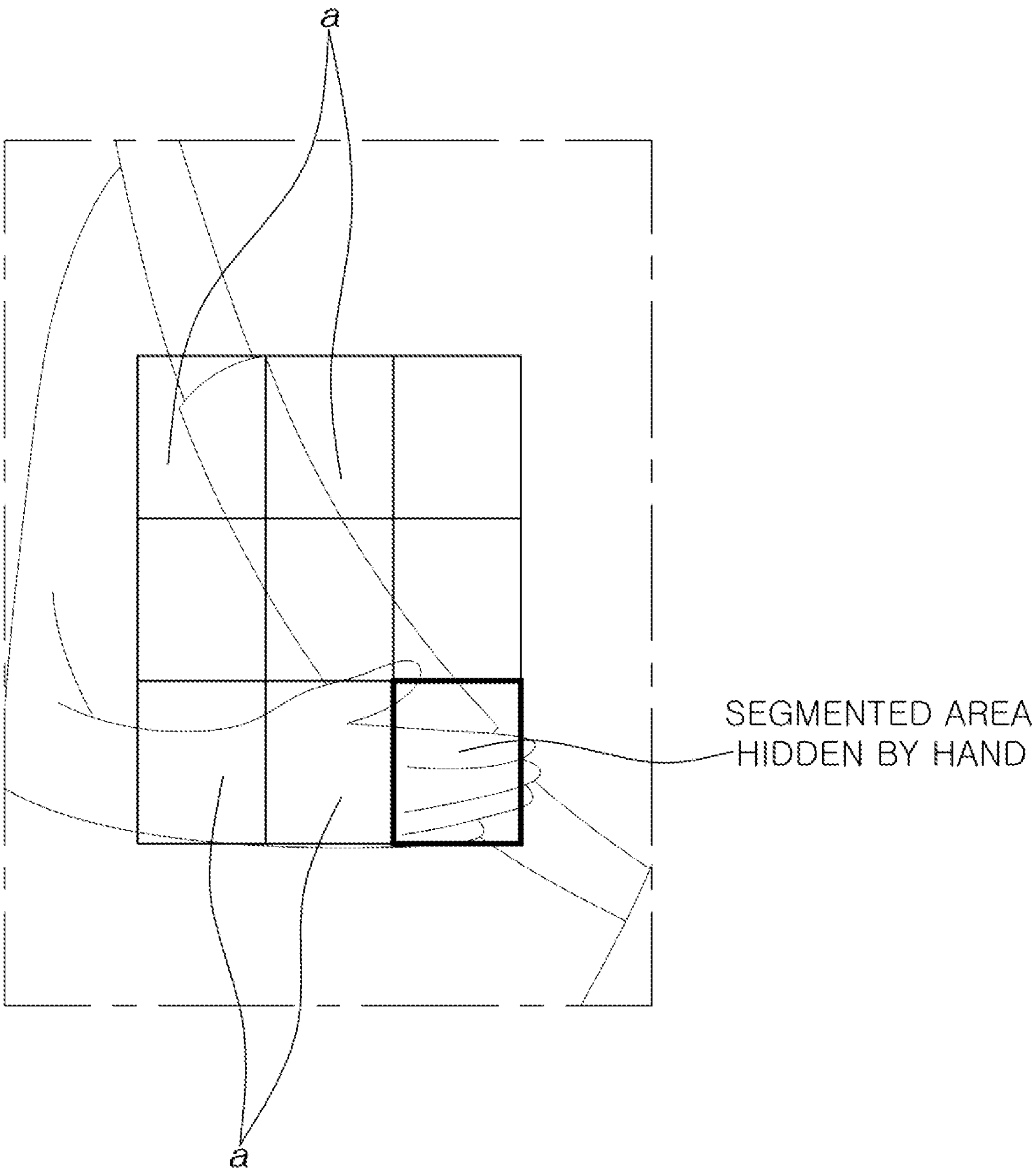

Subsequently, as shown in FIG. 18, when a passenger's hand is detected within the cover area A1 and the segmented area a where the belt cover 510 is positioned is hidden by the passenger's hand, the hidden area detection unit 120 can detect the hidden segmented area a.

Here, an output signal may be designated for each segmented area a.

Accordingly, the signal output unit 130 outputs the output signal designated for the hidden segmented area a, and thus the function of the electronic device corresponding to the output signal can be performed.

Figure 3:
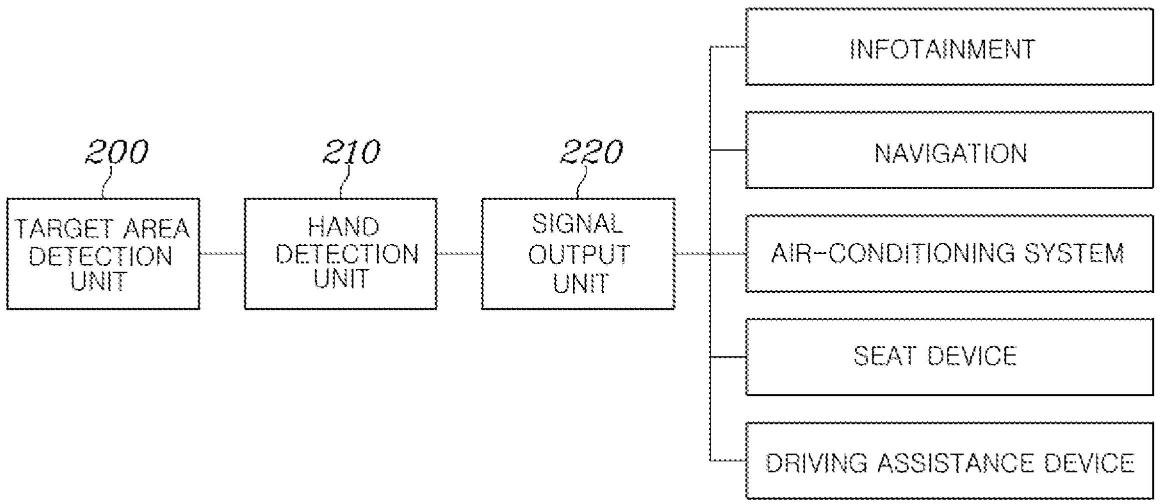
FIG. 3 is a diagram showing a configuration of a fourth embodiment of the gesture recognition system according to the present disclosure.

Referring to FIG. 3, the configuration of the fourth embodiment of the passenger gesture recognition system according to the present disclosure includes a target area detection unit 200 that detects a detection target area around the webbing 500 of the seat belt fastened to a passenger, a hand detection unit 210 that detects a passenger's hand positioned within the detection target area according to a gesture operation when the passenger performs a gesture, a signal output unit 220 that outputs an output signal designated for the position of the hand and controls a function with respect to the output signal to be performed.

For example, the target area detection unit 200 detects a detection target area based on an image captured by the image sensor 400, and the image sensor 400 may be a vision sensor that detects IR and RGB.

Since the image sensor 400 has been described above, redundant description thereof will be omitted.

In addition, the target area detection unit 200 detects a detection target area limited to the area around the webbing 500 of the seat belt. The webbing 500 may be shoulder webbing worn on the passenger's shoulders and upper body.

Accordingly, hardware resources are reduced by reducing the area in which the target area detection unit 200 operates to detect a detection target area, and misdetection of a detection target area and a malfunction are prevented by preventing operation in an area without the webbing 500.

The hand detection unit 210 detects a passenger's hand moving according to a gesture of the passenger (user) based on an image captured by the image sensor 400.

The signal output unit 220 serves to output an output signal for a hidden area.

The configuration of the fourth embodiment of the gesture recognition system is described in detail with reference to FIG. 3 and FIGS. 19 to 21. The target area detection unit 200 may detect the upper body of the passenger and set an upper body area A2 as a detection target area, and the hand detection unit 210 may detect the position of a hand on the path of the webbing 500 located within the upper body area A2.

The signal output unit 220 may secure a classification value of the hand position by comparing the coordinates of the detected hand position with the designated coordinates of the upper body area A2 and output a designated output signal for the secured classification value.

Specifically, the target area detection unit 200 may be a passenger detector that detects the body shape and a body part of the passenger through an image recognition algorithm based on AI.

Additionally, the hand detection unit 210 may be a passenger detector that detects the body shape and a body part of the passenger through an image recognition algorithm based on AI.

Figure 19:
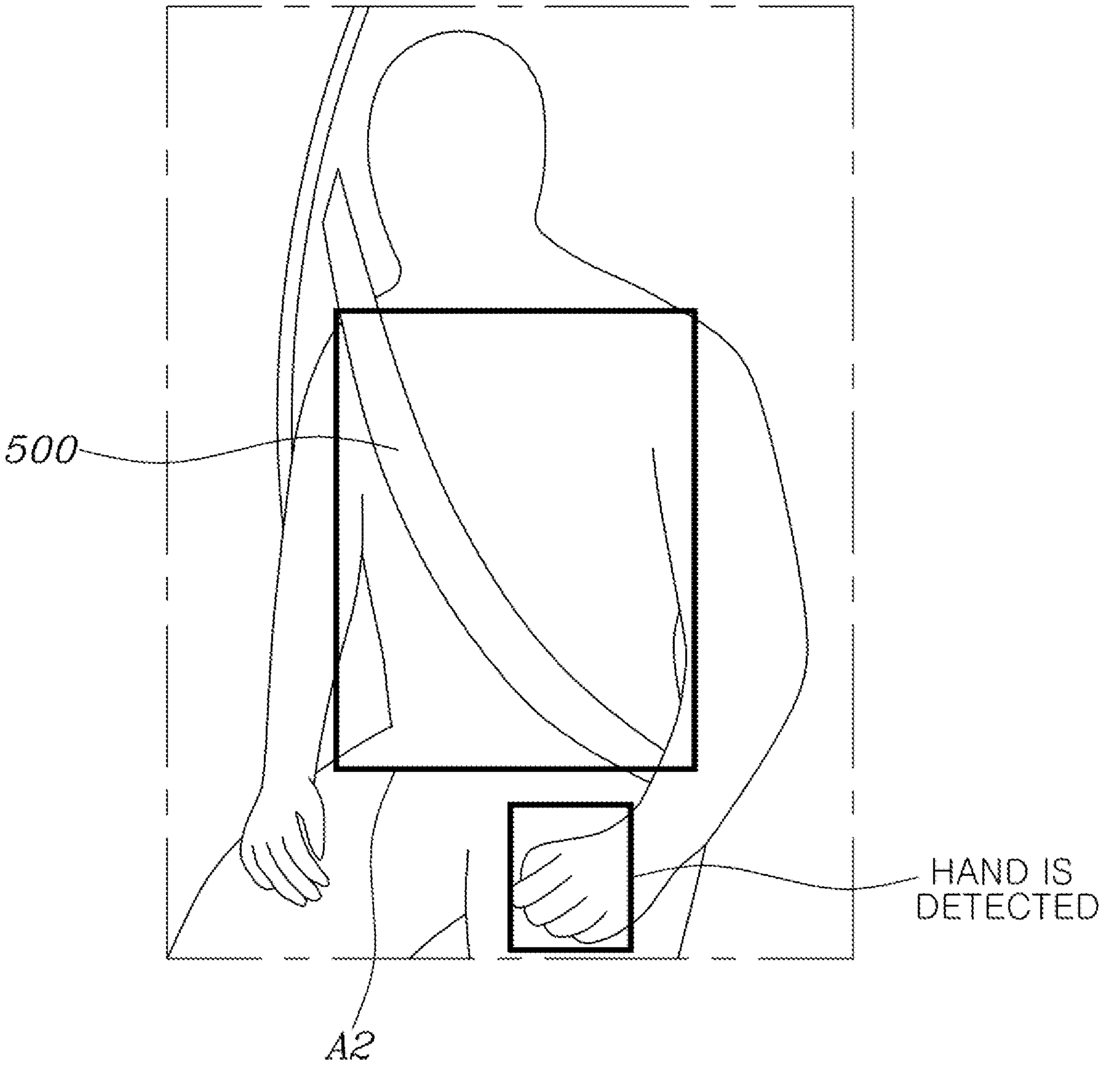
FIGS. 19 to 21 are diagrams for describing an operation of recognizing a gesture according to the fourth embodiment of the gesture recognition system of the present disclosure.

Accordingly, as shown in FIG. 19, the upper body area A2 including the upper body of the passenger is detected in the form of a square box from an image captured by the image sensor 400, and the passenger's hand is also detected in the form of a square box.

Figure 20:
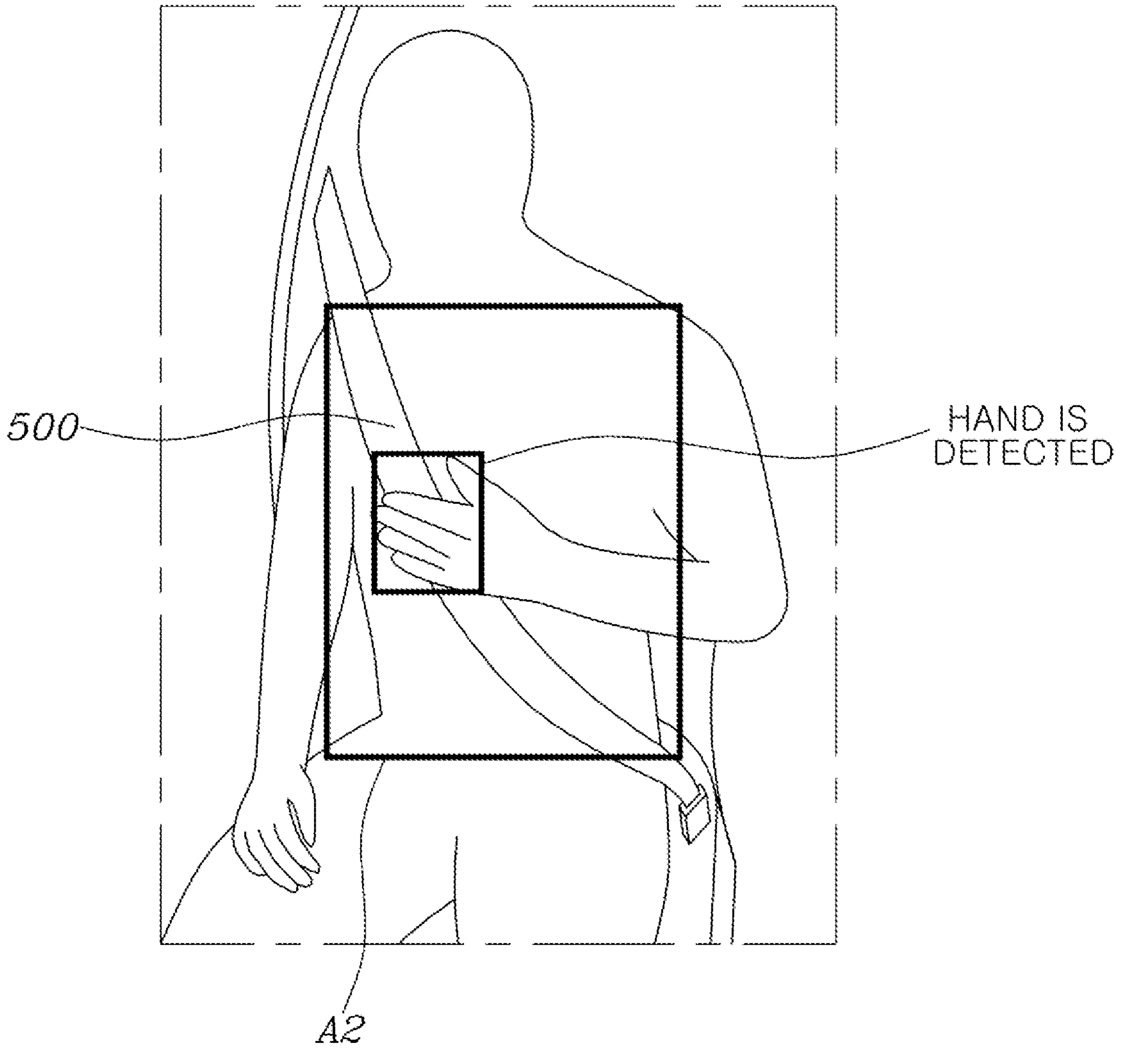
Figure 21:
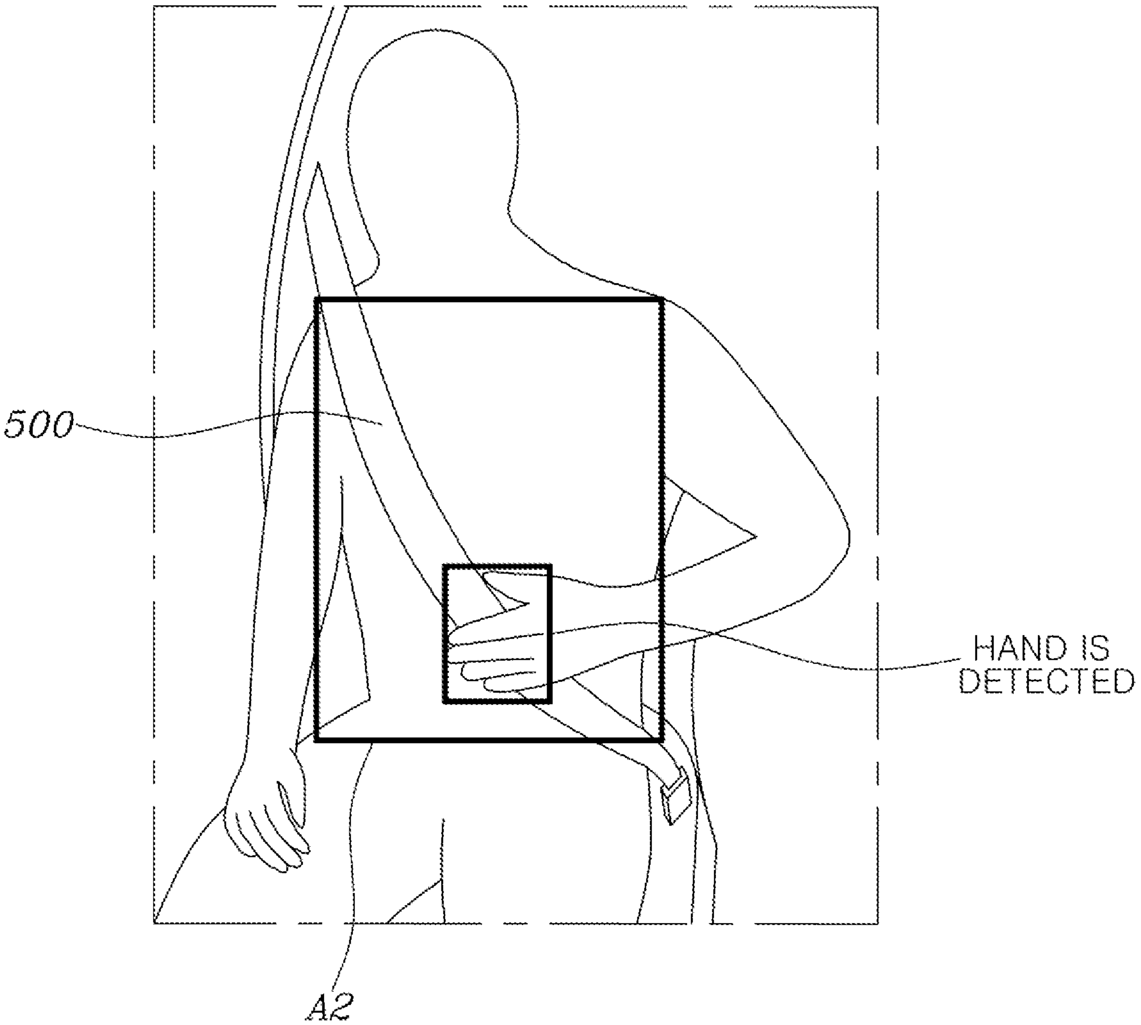

Then, as shown in FIGS. 20 and 21, when the passenger's hand is detected within the upper body area A2, it is checked whether the passenger's hand is positioned on the path of the webbing 500.

If the passenger's hand is positioned on the path of the webbing 500, the signal output unit 220 outputs a designated output signal for the part where the passenger's hand is positioned, and thus the function of the electronic device corresponding to the output signal is performed.

Figure 4:
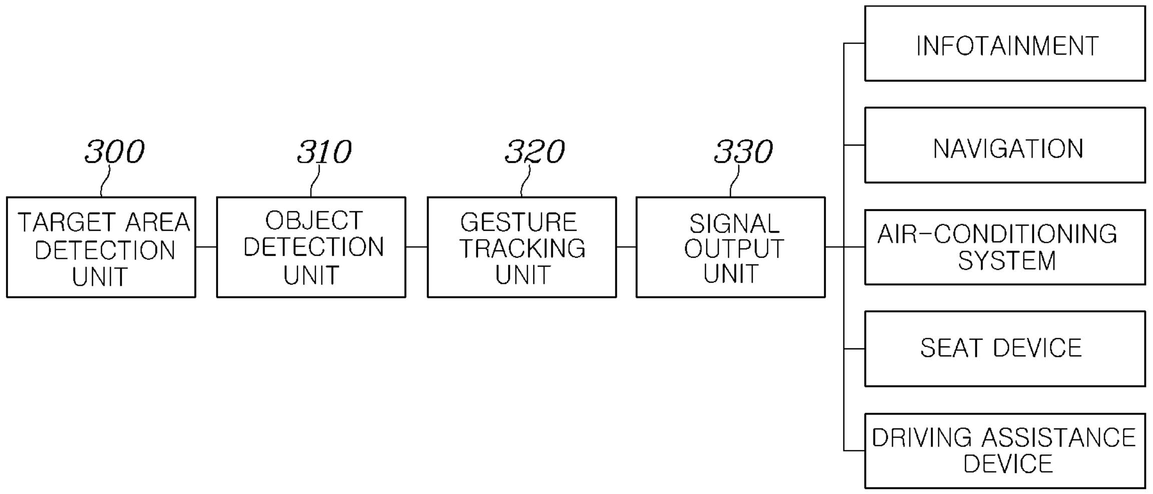
FIG. 4 is a diagram showing a configuration of a fifth embodiment of the gesture recognition system according to the present disclosure.
Figure 5:
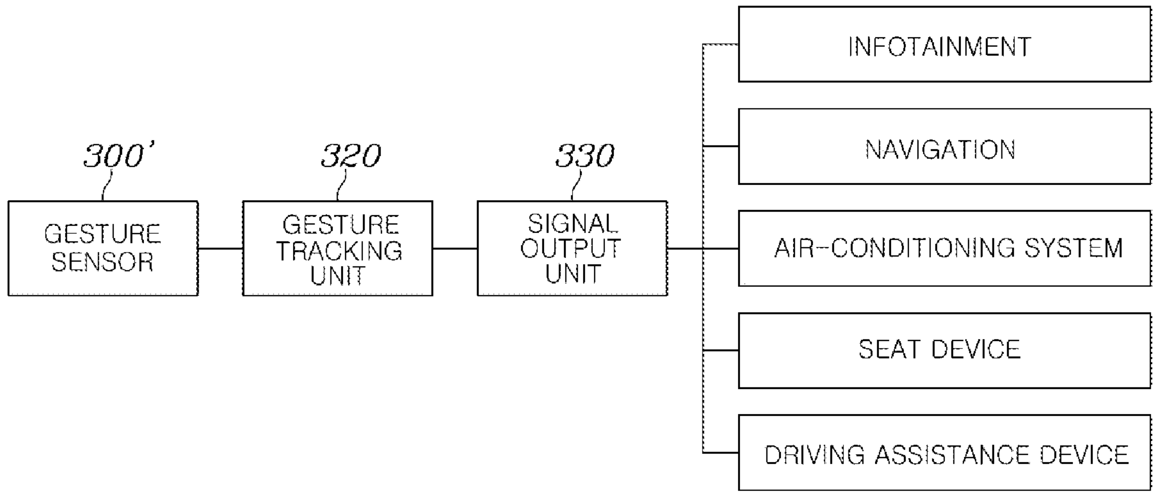
FIG. 5 is a diagram showing a configuration of a sixth embodiment of the gesture recognition system according to the present disclosure.

Referring to FIGS. 4 and 5, the configuration of fifth and sixth embodiments of the passenger gesture recognition system according to the present disclosure includes a gesture tracking unit 320 that tracks a passenger's gesture moving along the webbing 500 of the seat belt fastened to the passenger, and a signal output unit 330 that outputs an output signal designated for a gesture movement and controls a function with respect to the output signal to be performed.

That is, as a passenger's gesture movement is performed along the path of the webbing 500, the operating area for gesture tracking is reduced and thus hardware resources are reduced. Further, a function operation command is issued through a gesture moving along the webbing 500, and thus it is possible to perform a gesture without having to be conscious of a designated area where gestures need to be performed, which not only improves the convenience of performing a gesture but also improves the gesture recognition rate.

The configuration of the fifth embodiment of the gesture recognition system is described in detail with reference to FIG. 4 and FIGS. 22 to 24. The configuration further includes a target area detection unit 300 that detects a detection target area around the webbing 500 and an object detection unit 310 that detects a gesture object located within the detection target area according to a gesture operation, and the gesture tracking unit 320 is configured to track a gesture object moving within the detection target area according to a gesture operation of the passenger.

For example, the target area detection unit 300 may be a vision sensor that detects a detection target area based on an image captured by the image sensor 400.

In addition, the target area detection unit 300 detects a detection target area limited to the webbing 500 of the seat belt.

Accordingly, hardware resources are reduced by reducing the area in which the target area detection unit 300 operates to detect a detection target area, and misdetection of a detection target area and a malfunction are prevented by preventing operation in an area without the webbing 500.

The object detection unit 310 may detect a passenger's hand moving within the detection target area according to a gesture of the passenger (user) or detect an object held by the passenger's hand based on an image captured by the image sensor 400.

In addition, the target area detection unit 300 may detect the webbing 500 of the seat belt based on a captured image of the passenger and sets the same as a detection target area, and the object detection unit 310 may detect one of a passenger's hand moving along the webbing 500, the belt cover 510, and the belt clip as a gesture object.

Specifically, the target area detection unit 300 may be an object detector that individually detects objects shown in an image through an image recognition algorithm based on AI.

In addition, the object detection unit 310 may be a passenger detector that detects the body shape and a body part of the passenger through an image recognition algorithm when the gesture object is a passenger's hand, and may be an object detector that individually detects objects shown in an image through an image recognition algorithm when the gesture object is an object such as a belt cover 510 or a belt clip.

Figure 22:
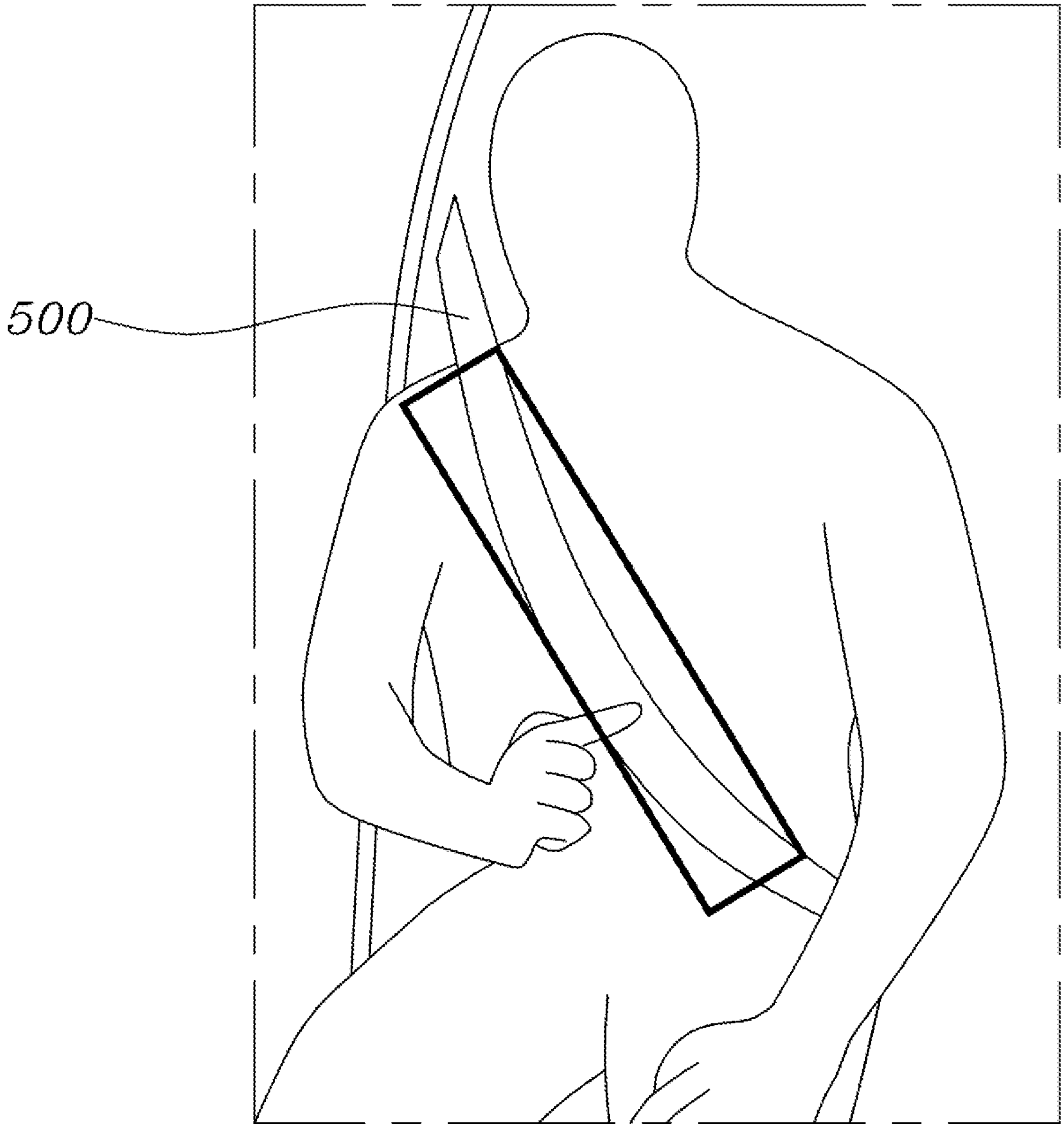
FIGS. 22 to 24 are diagrams for describing an operation of recognizing a gesture according to the fifth embodiment of the gesture recognition system of the present disclosure.

Accordingly, as shown in FIG. 22, the webbing 500 of the seat belt is detected in the form of a square box from an image captured by the image sensor 400, and when the gesture object is designated as a passenger's hand, the passenger's hand is detected.

In addition, when the passenger's hand is detected on the path of the webbing 500, the passenger's hand is tracked.

Figure 23:
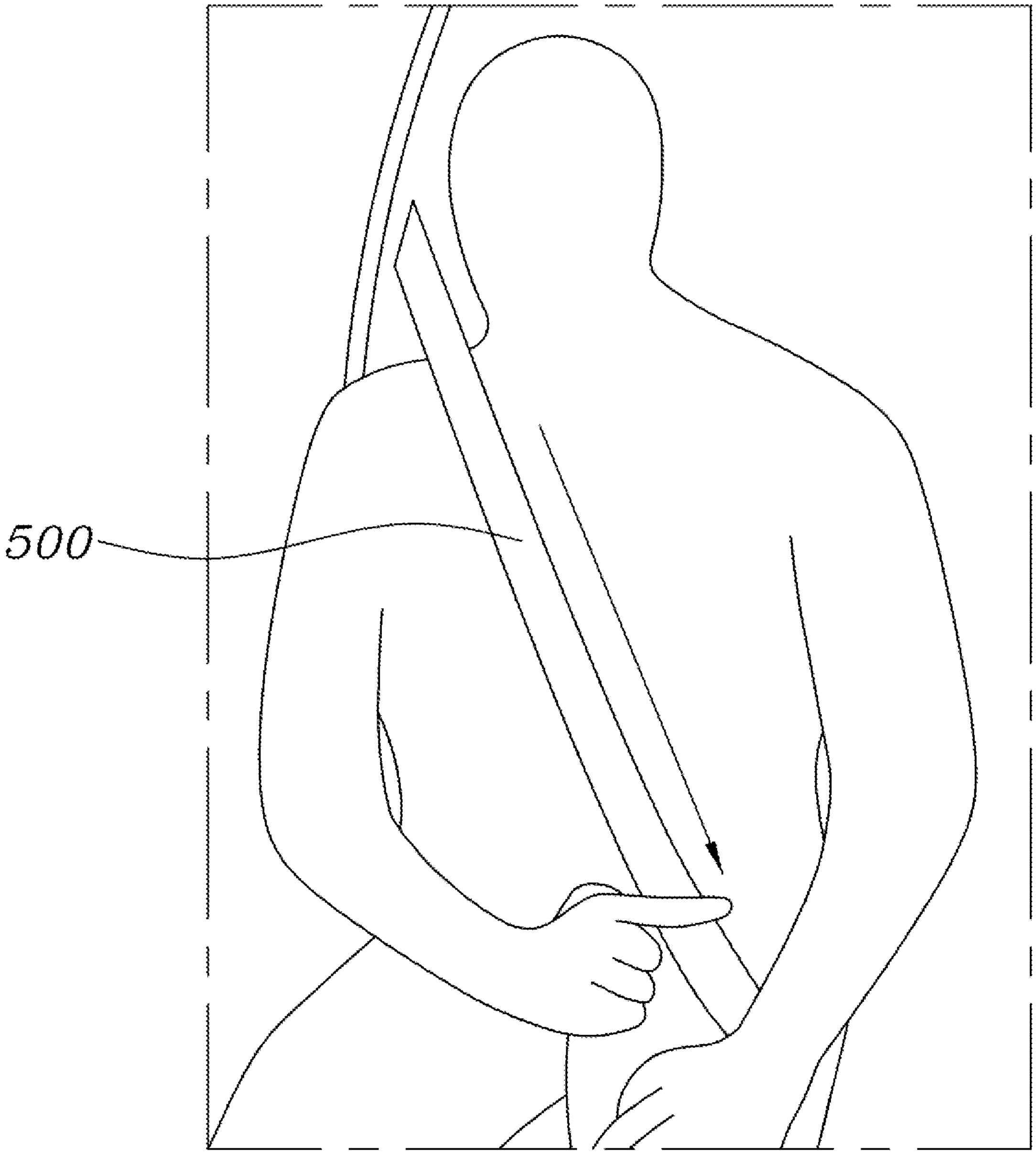

Accordingly, as shown in FIG. 23, when the passenger's hand moves downward on the path of the webbing 500 as if sweeping the webbing 500, the signal output unit 330 outputs a designated output for the downward movement of the passenger's hand, and thus the function of the electronic device corresponding to the output signal can be performed.

Figure 24:
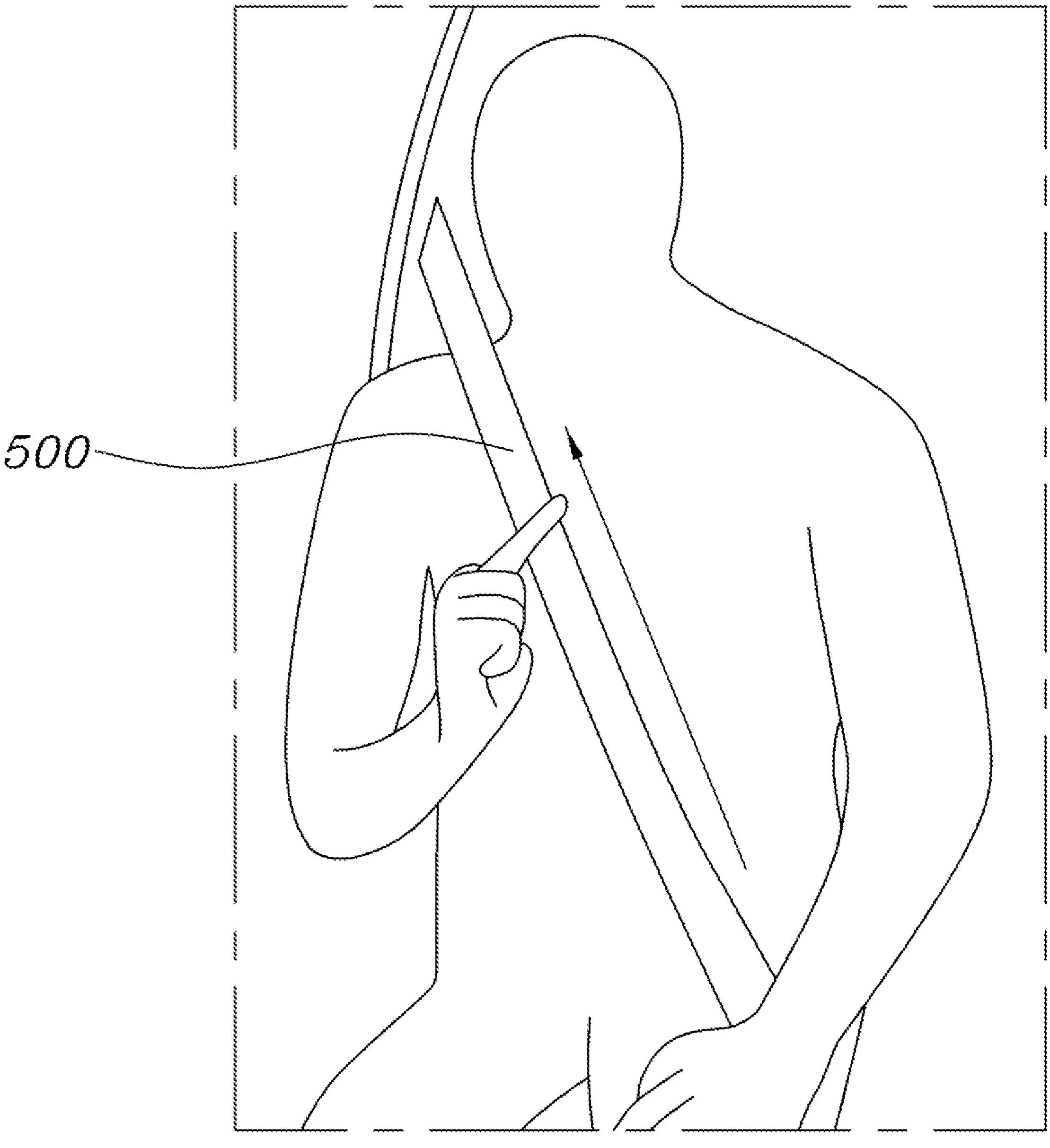

In addition, as shown in FIG. 24, when the passenger's hand moves upward on the path of the webbing 500 as if sweeping the webbing 500, the signal output unit 330 outputs a designated output for the upward movement of the passenger's hand, and thus the function of the electronic device corresponding to the output signal can be performed.

Although FIGS. 23 and 24 illustrate a passenger's hand as a gesture object, a gesture can be recognized to operate the device in the same manner as above even when an object such as the belt cover 510 or the belt clip is used as a gesture object.

Further, in the present disclosure, reflective paint may be applied to the surface of the gesture object.

That is, when an object such as the belt cover 510 or the belt clip is used as a gesture object, the surface of the belt cover 510 or the belt clip is coated with reflective paint, making it easier to detect the gesture object, thereby increasing the detection rate.

In addition, in the present disclosure, the signal output unit 330 may determine whether there is a designated output signal bundle for a detected hand shape.

Figure 25:
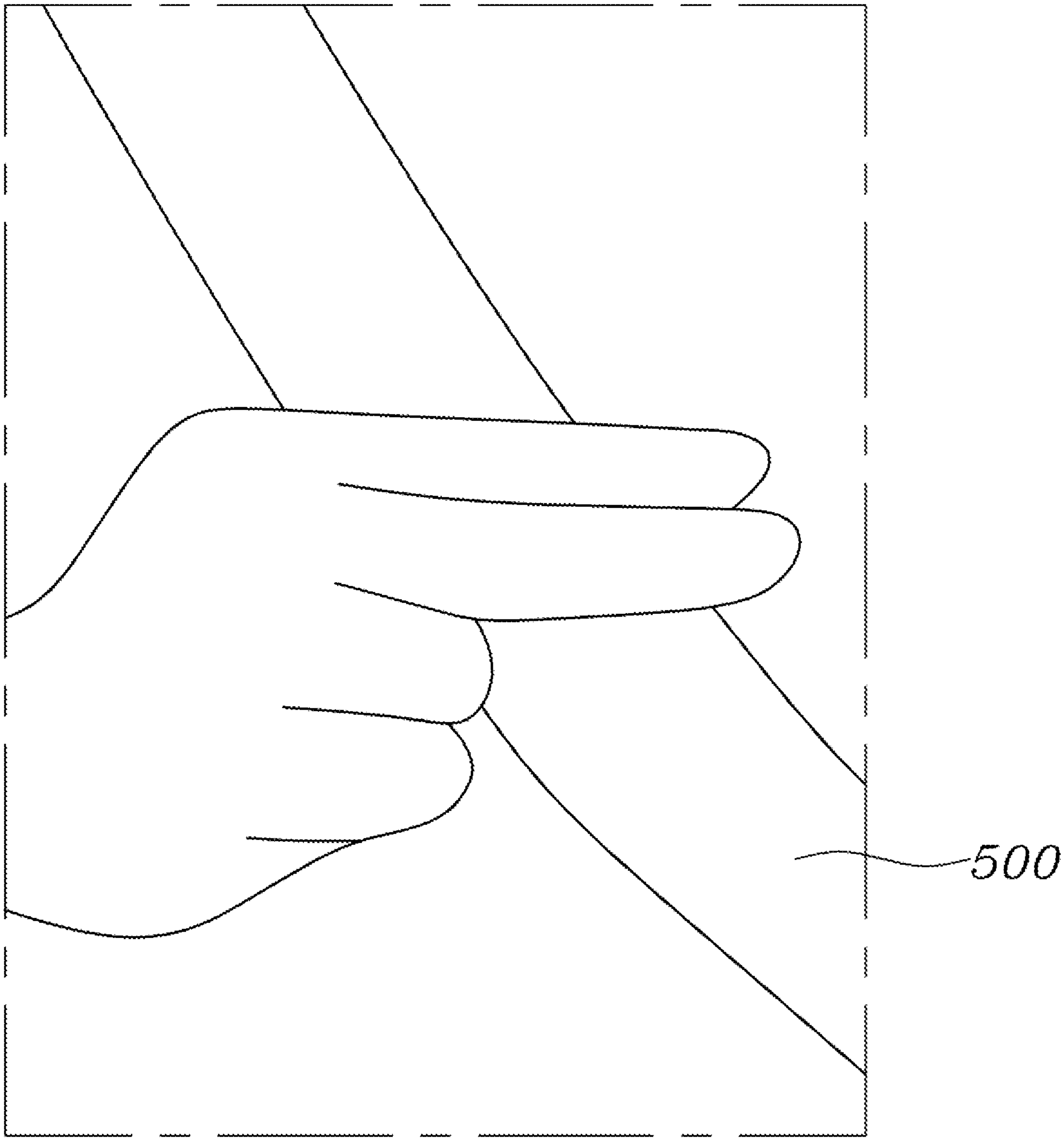
FIGS. 25 to 27 are diagrams illustrating different hand shapes used in the fifth embodiment of the gesture recognition system of the present disclosure.
Figure 26:
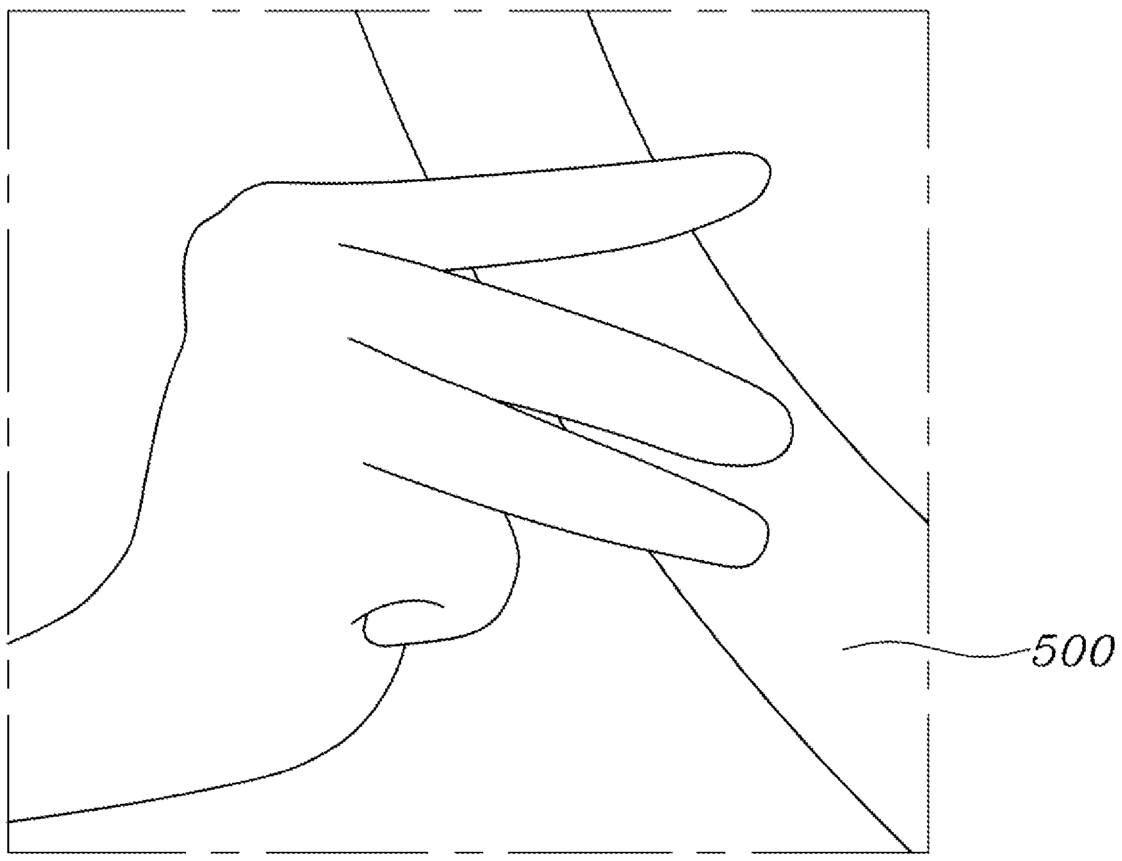
Figure 27:
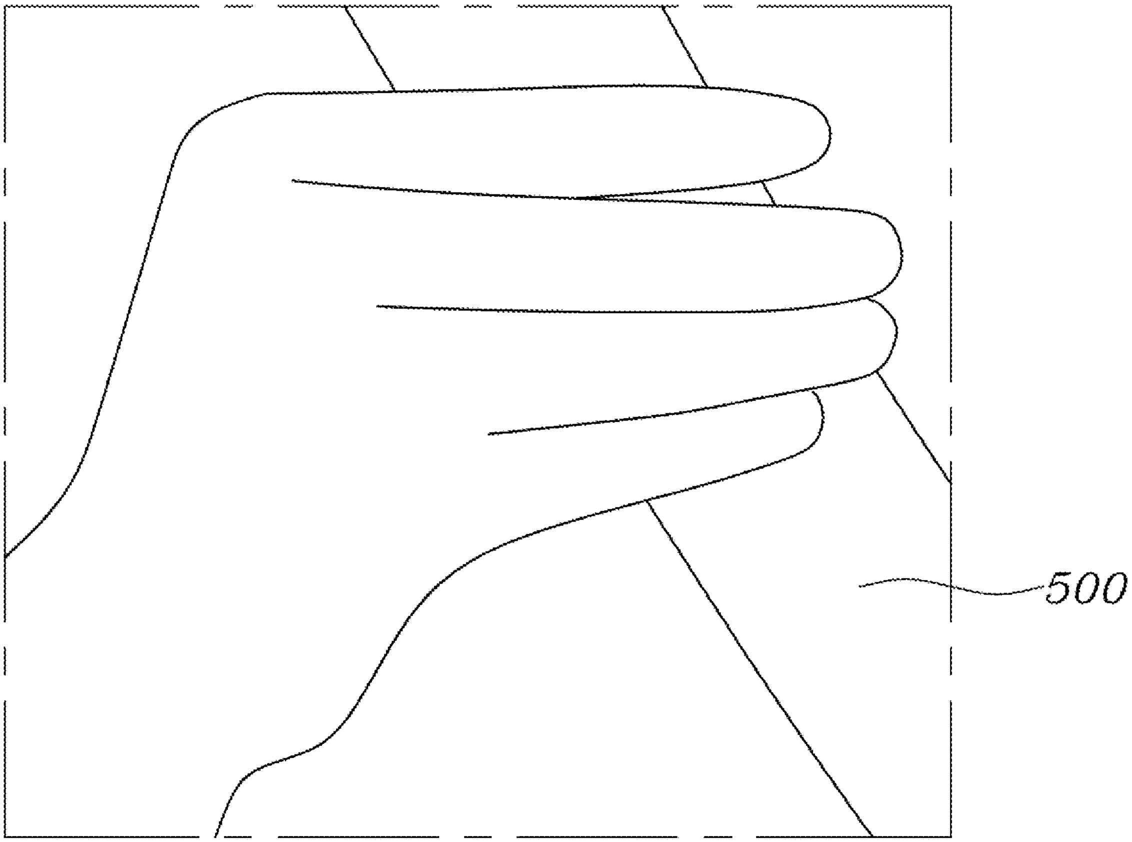

That is, as shown in FIGS. 25 to 27, various hand shapes of the passenger can be detected, and the same gesture, that is, downward or upward movement along the webbing 500, can be performed with different hand shapes.

However, even for the same gesture, the number of functions that can be performed can be increased by designating output signals such that a different function is performed for each hand shape.

Meanwhile, referring to FIG. 5, the configuration of the sixth embodiment of the gesture recognition system further includes a gesture sensor 300' provided to be movable along the webbing 500 by a passenger's gesture movement, and the gesture tracking unit 320 is configured to track the gesture sensor 300' moving along the webbing 500 when the passenger performs a gesture.

For example, the gesture sensor 300' may be a sensor such as a gyro sensor provided inside the belt cover 510 or the belt clip, and the belt cover 510 and the belt clip may be able to move along the webbing 500.

Accordingly, when the belt cover 510 or the belt clip moves along the webbing 500 by a passenger's gesture, the gesture tracking unit 320 detects the movement of the gyro sensor provided inside the belt cover 510 or the belt clip to recognize the passenger's gesture.

Therefore, when the passenger's hand moves downward or upward along the path of the webbing 500, the signal output unit 330 outputs a designated output signal for the downward or upward movement of the passenger's hand, and thus the function of the electronic device corresponding to the output signal can be performed.

In addition, the signal output unit 330 may determine whether there is a designated output signal bundle for a movement pattern of the gesture sensor 300'.

That is, it is possible to detect various movement patterns of the gesture sensor 300', for example, a movement speed of the gesture sensor 300', a direction in which the front of the gesture sensor 300' faces, and the like, and the same gesture, that is, moving the gesture sensor 300' downward or upward, can be performed while changing the movement pattern of the gesture sensor 300'.

However, even for the same gesture, the number of functions that can be performed can be increased by designating output signals such that a different function is performed for each movement pattern of the gesture sensor 300'.

Hereinafter, examples of a process of recognizing a gesture using the gesture recognition system of the present disclosure will be described.

First Embodiment

Figure 28:
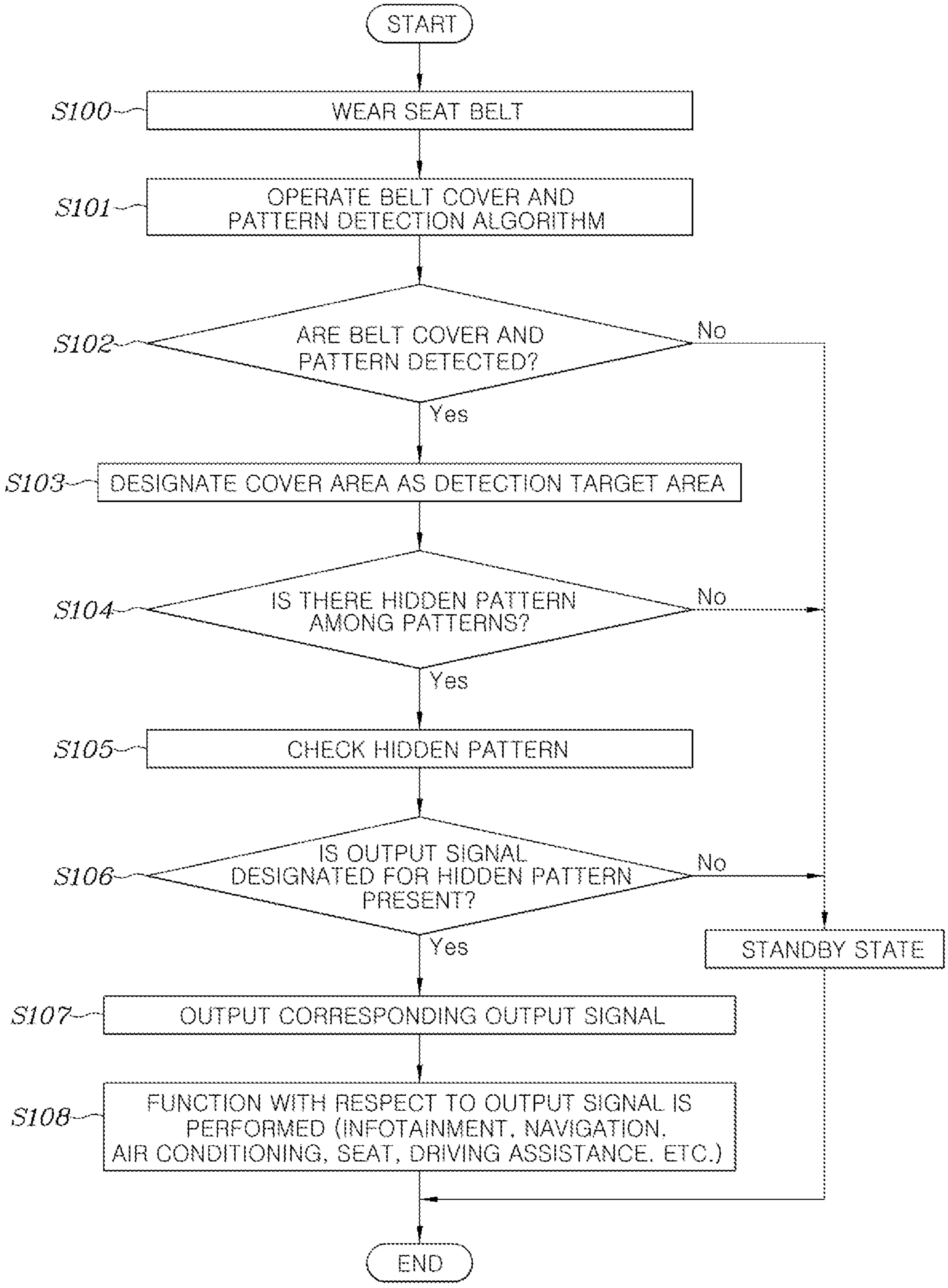
FIG. 28 is a flowchart illustrating a process of recognizing a gesture according to the first embodiment of the gesture recognition system of the present disclosure.

Referring to FIG. 28, an object detection algorithm for detecting the belt cover 510 and patterns P of the seat belt is operated in a state in which a passenger is wearing the seat belt (S100 and S101).

According to the operation of the object detection algorithm, it is determined whether the belt cover 510 and the patterns P printed on the belt cover 510 have been detected (S102).

As a result of determination in step S102, if the belt cover 510 and the patterns P are detected, the cover area A1 including the belt cover 510 is set as a detection target area (S103).

Subsequently, when the passenger performs a gesture, it is checked whether there is a pattern P that is hidden by the gesture among the patterns P printed on the belt cover 510 (S104).

As a result of checking in step S104, if it is confirmed that there is a hidden pattern P, it is determined whether an output signal designated for the hidden pattern P is present (S105 and S106).

As a result of determination in step S106, if there is an output signal for the hidden pattern P, the output signal is output (S107).

Accordingly, the function of the electronic device corresponding to the output signal can be performed (S108).

Second Embodiment

Figure 29:
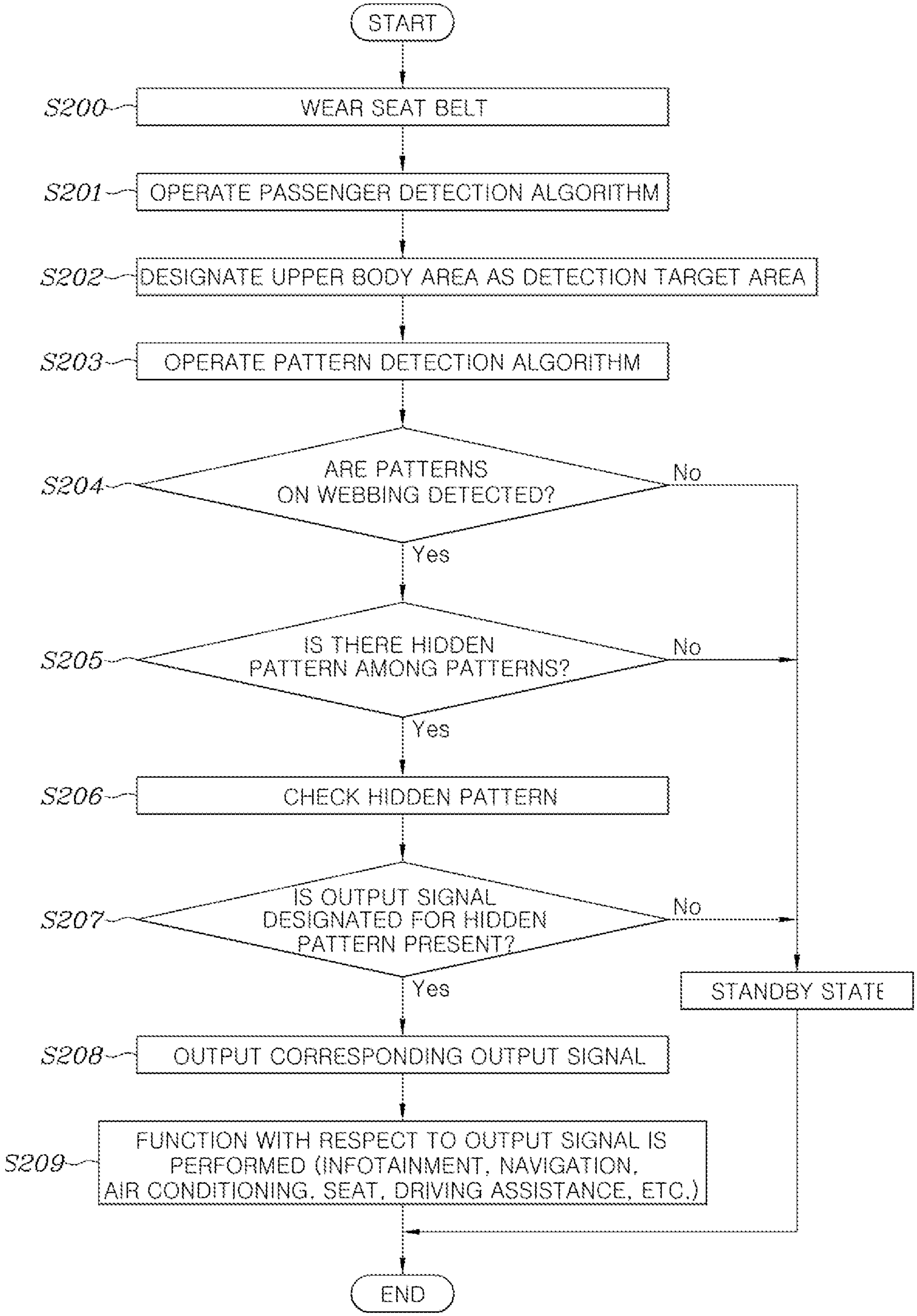
FIG. 29 is a flowchart illustrating a process of recognizing a gesture according to the second embodiment of the gesture recognition system of the present disclosure.

Referring to FIG. 29, a passenger detection algorithm for detecting a body part of a passenger while the passenger is wearing a seat belt is operated (S200 and S201).

According to the operation of the passenger detection algorithm, the upper body of the passenger is detected and the upper body area A2 is set as a detection target area (S202).

Then, an object detection algorithm for detecting patterns P printed on the webbing 500 of the seat belt is operated (S203).

According to the operation of the object detection algorithm, it is determined whether the patterns P printed on the webbing 500 have been detected (S204).

As a result of determination in step S204, when the patterns P printed on the webbing 500 have been detected, when the passenger performs a gesture in this state, it is checked whether there is a pattern hidden by the gesture among the patterns P printed on the belt cover 510 (S205).

As a result of checking in step S205, if it is confirmed that there is a hidden pattern P, it is determined whether an output signal designated for the hidden pattern P is present (S206 and S207).

As a result of determination in step S207, if there is an output signal for the hidden pattern P, the output signal is output (S208).

Accordingly, the function of the electronic device corresponding to the output signal can be performed (S209).

Third Embodiment

Figure 30:
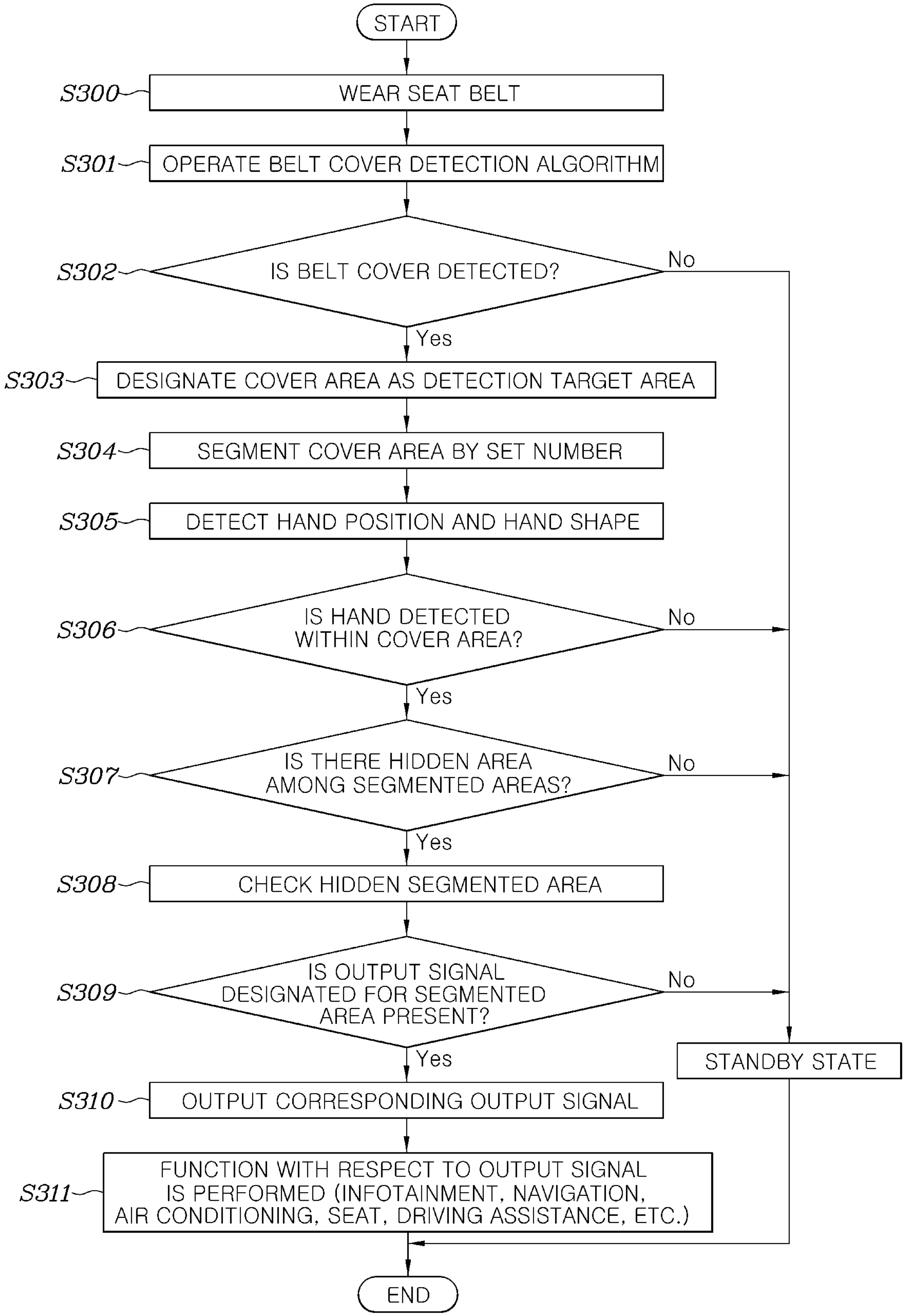
FIG. 30 is a flowchart illustrating a process of recognizing a gesture according to the third embodiment of the gesture recognition system of the present disclosure.

Referring to FIG. 30, an object detection algorithm for detecting the belt cover 510 of the seat belt while the passenger is wearing the seat belt is operated (S300 and S301).

It is determined whether the belt cover 510 has been detected according to the operation of the object detection algorithm (S302).

As a result of determination in step S302, when the belt cover 510 has been detected, the cover area A1 including the belt cover 510 is set as a detection target area (S303).

Then, the cover area A1 is segmented by a set number (S304).

Subsequently, a hand detection algorithm is operated to detect a passenger's hand position and hand shape (S305).

According to the operation of the hand detection algorithm, it is determined whether the passenger's hand has been detected within the cover area A1 (S306).

As a result of determination in step S306, when the passenger's hand has been detected within the cover area A1, it is determined whether there is a segmented area a hidden by the hand among the segmented areas (a) (S307).

As a result of determination in step S307, if it is confirmed that there is a hidden segmented area a on the webbing 500, it is determined whether an output signal designated for the hidden segmented area a is present (S308 and S309).

As a result of determination in step S309, if there is an output signal designated for the hidden pattern P, the output signal is output (S310).

Accordingly, the function of the electronic device corresponding to the output signal can be performed (S311).

Fourth Embodiment

Figure 31:
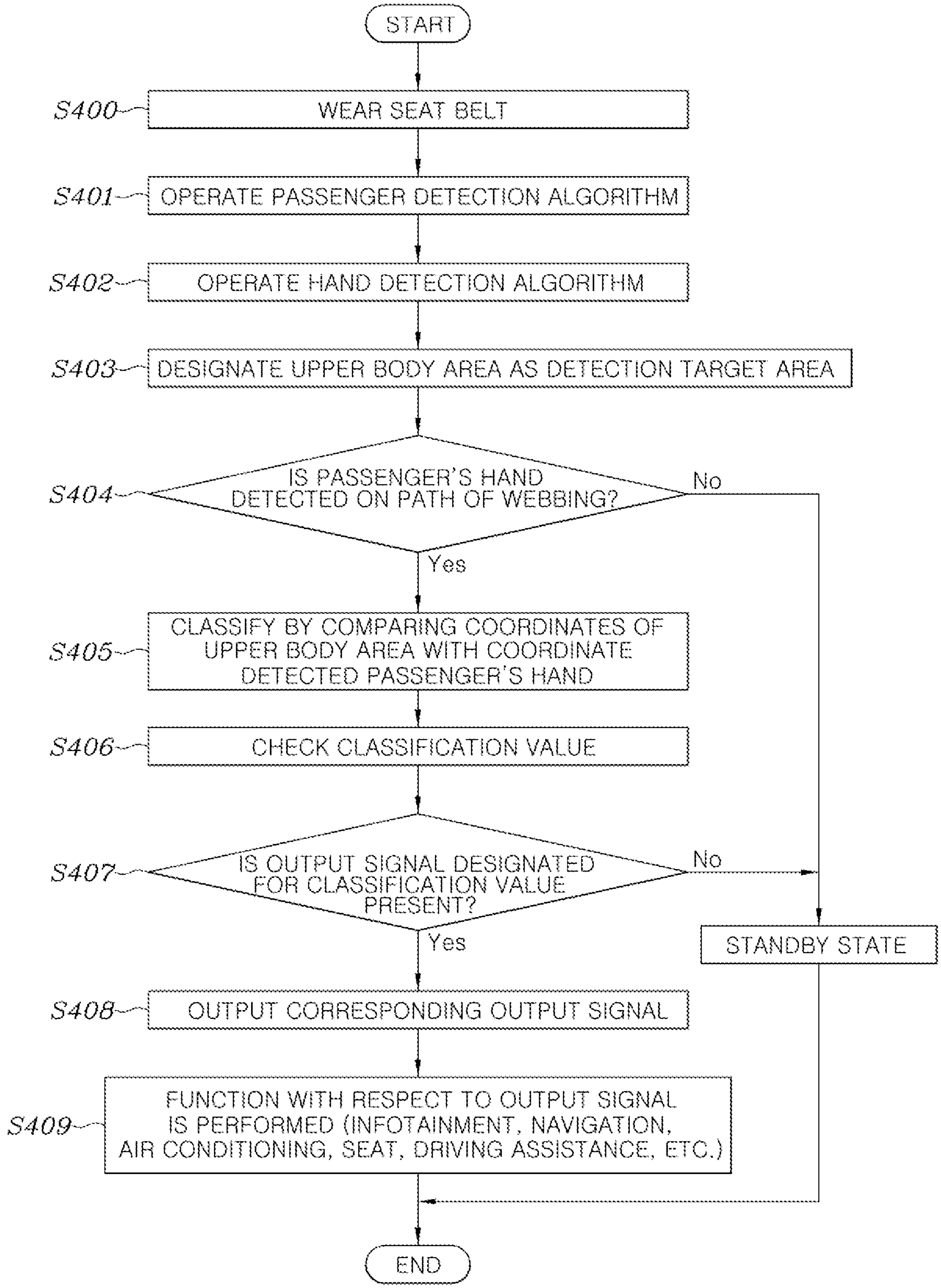
FIG. 31 is a flowchart illustrating a process of recognizing a gesture according to the fourth embodiment of the gesture recognition system of the present disclosure.

Referring to FIG. 31, a passenger detection algorithm for detecting a body part of a passenger while the passenger is wearing a seat belt is operated (S400 and S401). According to the operation of the passenger detection algorithm, the upper body of the passenger is detected and the upper body area A2 is set as a detection target area (S402).

Subsequently, a hand detection algorithm is operated to detect the position of a passenger's hand (S403).

According to the operation of the hand detection algorithm, it is determined whether the passenger's hand has been detected on the path of the webbing 500 (S404).

As a result of determination in step S404, when the passenger's hand has been detected, the position where the passenger's hand has been detected is classified by comparing the coordinates of the position where the passenger's hand has been detected with set coordinates of the upper body area A2, and a classification value is checked (S405 and S406).

Subsequently, it is determined whether an output signal designated for the classification value is present (S407).

As a result of determination in step S407, if an output signal designated for the classification value is present, the output signal is output (S408).

Accordingly, the function of the electronic device corresponding to the output signal can be performed (S409).

Fifth Embodiment

Figure 32:
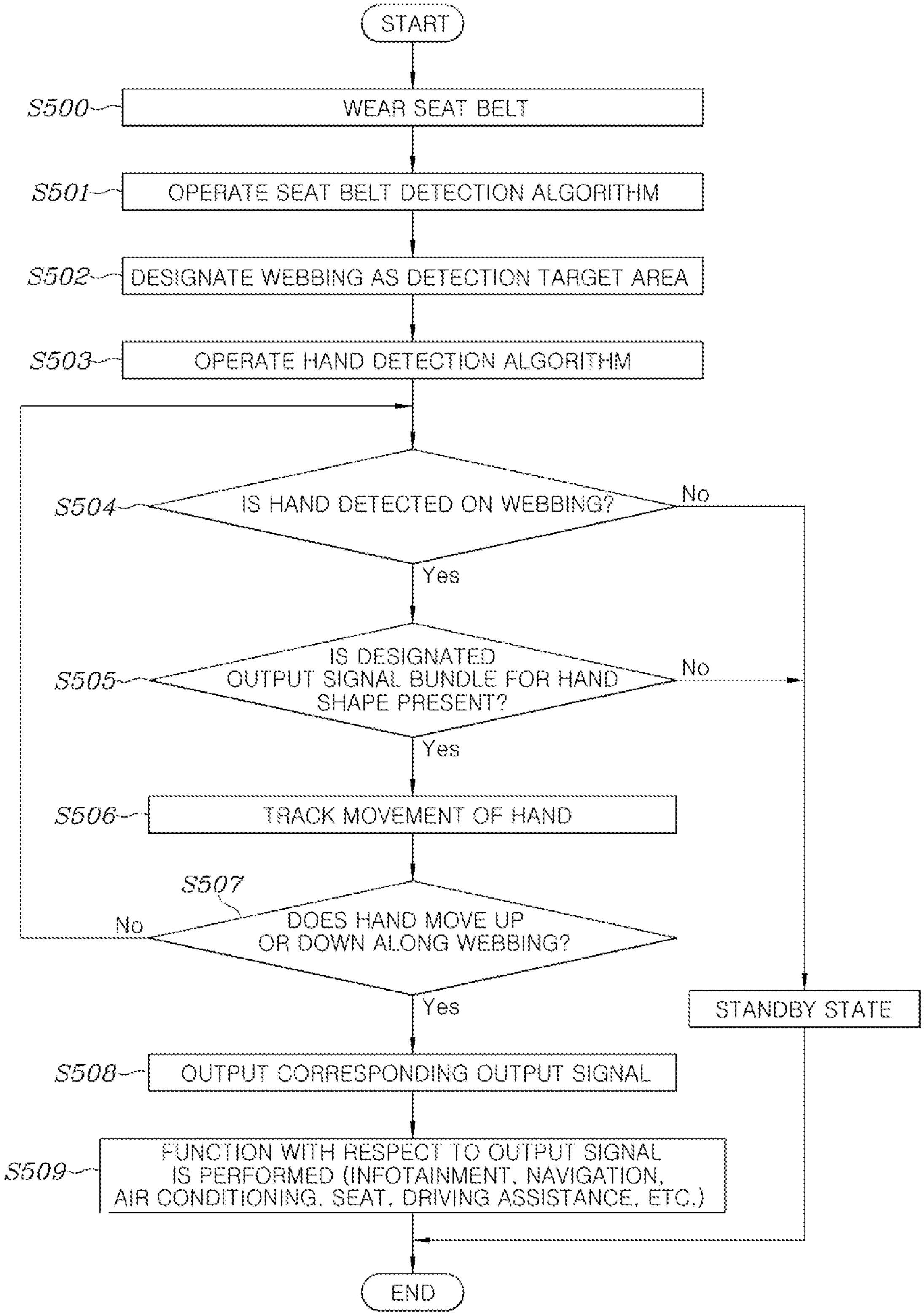
FIG. 32 is a flowchart illustrating a process of recognizing a gesture according to the fifth embodiment of the gesture recognition system of the present disclosure.

Referring to FIG. 32, an object detection algorithm for detecting a seat belt while a passenger is wearing the seat belt is operated (S500 and S501).

When the webbing 500 of the seat belt is detected according to the operation of the object detection algorithm, the webbing 500 is set as a detection target area (S502).

Subsequently, a hand detection algorithm is operated to detect a passenger's hand (S503).

According to the operation of the hand detection algorithm, it is determined whether the passenger's hand has been detected on the path of the webbing 500 (S504).

As a result of determination in step S504, when the passenger's hand has been detected, it is determined whether a designated output signal bundle for the detected hand shape of the passenger is present (S505).

As a result of determination in step S505, if it is determined that there is a designated output signal bundle for the detected hand shape, the movement of the hand is tracked (S506).

By tracking the movement of the hand, it is determined whether the hand moves up or down along the webbing 500 (S507).

As a result of determination in step S507, if the hand moves up or down along the webbing 500, an output signal designated for the corresponding movement is output (S508).

Accordingly, the function of the electronic device corresponding to the output signal can be performed (S509).

Sixth Embodiment

Figure 33:
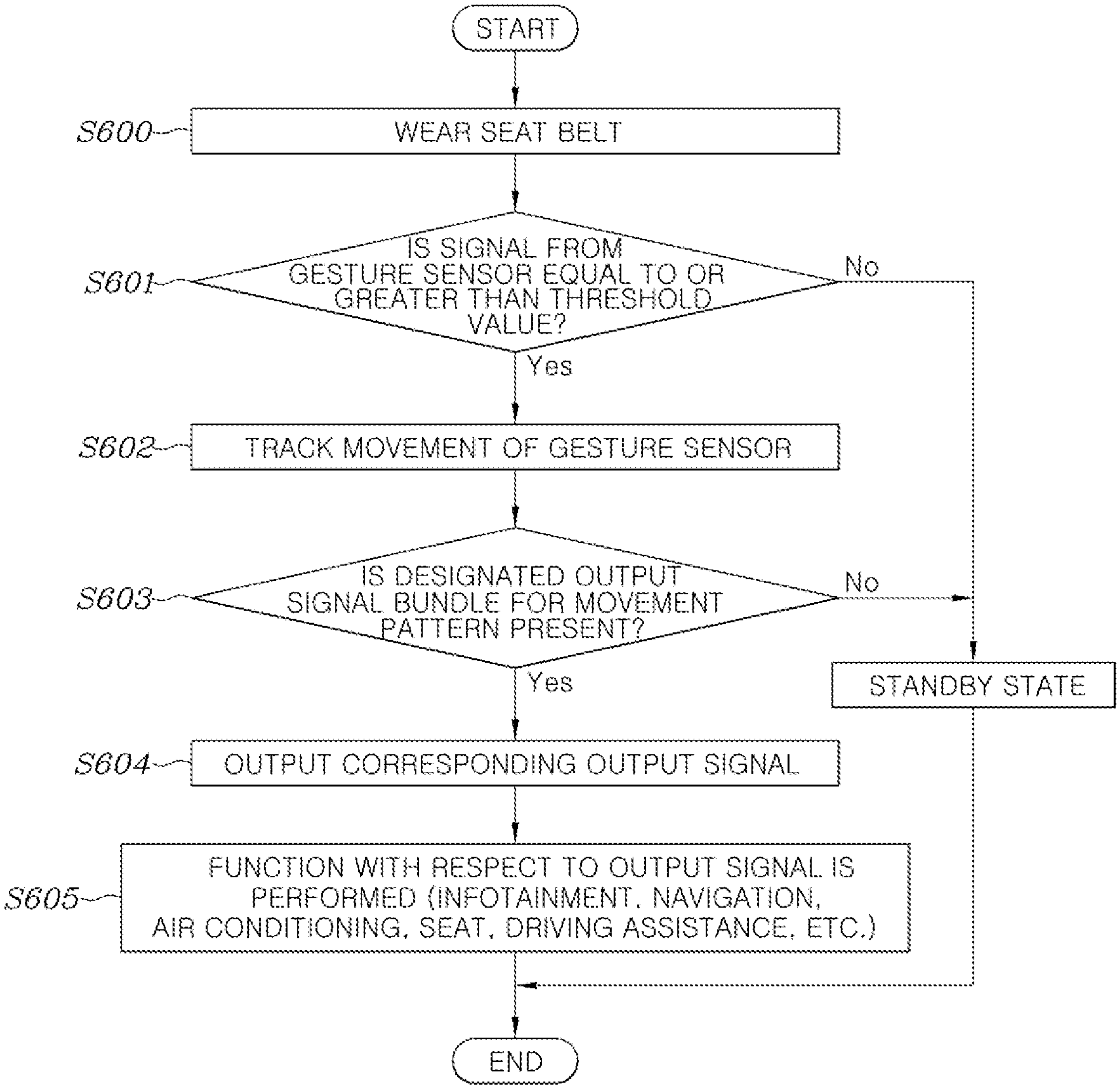
FIG. 33 is a flowchart illustrating a process of recognizing a gesture according to the sixth embodiment of the gesture recognition system of the present disclosure.

Referring to FIG. 33, a signal from the gesture sensor 300' is detected while a passenger is wearing a seat belt, and it is determined whether the signal from the gesture sensor 300' is equal to or greater than a threshold value (S600 and S601).

As a result of determination in step S601, if the signal from the gesture sensor 300' is equal to or greater than the threshold value, the movement of the gesture sensor 300' is tracked (S602).

Subsequently, it is determined whether a designated output signal bundle for the movement pattern of the gesture sensor 300' is present (S603).

As a result of determination in step S603, if it is determined that there is a designated output signal bundle for the movement pattern of the gesture sensor 300', an output signal designated for the corresponding movement is output (S604).

Accordingly, the function of the electronic device corresponding to the output signal can be performed (S605).

The present disclosure designates a detection target limited to the webbing of a seat belt always worn by a passenger.

Therefore, the present disclosure has the advantages of reducing development costs by simplifying an algorithm for gesture recognition and minimizing a labeling image capacity used for a DB, and minimizing costs for hardware construction by constructing an algorithm that can sufficiently operate even with low-quality images.

Moreover, since a command is given with a simple gesture covering the webbing, it is possible to perform a gesture without having to be conscious of a designated area in which the gesture needs to be made, and thus the convenience of performing a gesture and the gesture recognition rate can be improved.

Although the present disclosure has been described in detail only with respect to the above-mentioned specific examples, it is clear to those skilled in the art that various variations and modifications are possible within the technical scope of the present disclosure, and it is natural that such variations and modifications fall within the scope of the appended patent claims.

What is claimed is:

1. A system for recognizing gestures of a passenger in a vehicle, the system comprising:

a controller comprising a target area detection unit configured to detect a detection target area based on an image captured by an image sensor, the detection target area being located on a portion of a webbing of a seat belt configured to be fastened to the passenger and around the portion of the webbing;

a hidden area detection unit of the controller configured to detect an area hidden within the detection target area by a gesture of the passenger; and a signal output unit of the controller configured to output an output signal designated for the hidden area and control a function with respect to the output signal to be performed.

2. The system of claim 1, wherein the target area detection unit is further configured to detect patterns within the detection target area.

3. The system of claim 2, wherein the patterns are printed on a belt cover provided on the webbing or the webbing.

4. The system of claim 2, wherein the target area detection unit is further configured to:

detect the belt cover provided on the webbing based on a captured image of the passenger, set a cover area including the belt cover as a detection target area, and detect patterns provided on the belt cover within the set cover area.

5. The system of claim 2, wherein the target area detection unit is further configured to:

detect an upper body of the passenger based on a captured image of the passenger, set an upper body area as a detection target area, and detect patterns provided on the webbing within the set upper body area.

6. The system of claim 2, wherein the hidden area is an area where a pattern hidden by a gesture is located among the patterns.

7. The system of claim 6, wherein the signal output unit is further configured to output an output signal designated for the hidden pattern.

8. The system of claim 1, wherein the target area detection unit is further configured to:

detect the belt cover provided on the webbing based on a captured image of the passenger, set a cover area including the belt cover as a detection target area, segment the set cover area, and detect the segmented areas.

9. The system of claim 8, further comprising a hand detection unit configured to detect a passenger's hand positioned within the detection target area by a gesture, wherein the hidden area is a segmented area hidden by the passenger's hand.

10. A vehicle comprising the system of claim 1.

11. A system for recognizing gestures of a passenger in a vehicle, the system comprising:

a controller comprising a target area detection unit configured to detect a detection target area based on an image captured by an image sensor, the detection target area being located on a portion of a webbing of a seat belt fastened to the passenger and around the portion of the webbing;

a hand detection unit of the controller configured to detect a passenger's hand positioned within the detection target area by a gesture when the passenger performs the gesture; and a signal output unit of the controller configured to output an output signal designated for the position of the hand and control a function with respect to the output signal to be performed.

12. The system of claim 11, wherein:

the target area detection unit is further configured to detect an upper body of the passenger and sets an upper body area as a detection target area, and the hand detection unit is further configured to detect a position of a hand on a path of the webbing located within the upper body area.

13. The system of claim 12, wherein the signal output unit is further configured to:

secure a classification value of the hand position by comparing coordinates of the detected hand position with designated coordinates of the upper body area, and output an output signal designated for the secured classification value.

14. A system for recognizing gestures of a passenger in a vehicle, the system comprising:

a controller comprising a gesture tracking unit configured to track a gesture movement within a detection target area based on an image captured by an image sensor when the passenger performs a gesture moving along webbing of a seat belt fastened to the passenger, the detection target area being located on a portion of the webbing and around the portion of the webbing; and a signal output unit of the controller configured to output an output signal designated for the gesture movement and control a function with respect to the output signal to be performed.

15. The system of claim 14, further comprising:

a target area detection unit configured to detect a detection target area around the webbing; and an object detection unit configured to detect a gesture object located within the detection target area by a gesture, wherein the gesture tracking unit is further configured to track a gesture object moving within the detection target area by a gesture of the passenger.

16. The system of claim 15, wherein:

the target area detection unit is further configured to detect the webbing of the seat belt based on a captured image of the passenger and sets the webbing as a detection target area, and the object detection unit is further configured to detect one of a passenger's hand moving along the webbing, a belt cover, and a belt clip as a gesture object.

17. The system of claim 16, wherein the surface of the gesture object is coated with reflective paint.

18. The system of claim 16, wherein the signal output unit is further configured to determine whether there is a designated output signal bundle for a detected hand shape.

19. The system of claim 14, further comprising a gesture sensor provided to be movable along the webbing by a gesture of the passenger, wherein the gesture tracking unit is further configured to track the gesture sensor moving along the webbing when the passenger performs a gesture.

20. The system of claim 19, wherein the signal output unit is further configured to determine whether there is a designated output signal bundle for a movement pattern of the gesture sensor.

* * * * *